US009517498B2

(12) United States Patent
Siles et al.

(10) Patent No.: US 9,517,498 B2
(45) Date of Patent: Dec. 13, 2016

(54) ALUMINUM IMPACT EXTRUDED BOTTLE WITH THREADED NECK MADE FROM RECYCLED ALUMINUM AND ENHANCED ALLOYS

(71) Applicant: Ball Corporation, Broomfield, CO (US)

(72) Inventors: John L. Siles, Westminster, CO (US); Matthias K. van de Liefvoort, Louisville, CO (US); Kevin Reed Jentzsch, Arvada, CO (US)

(73) Assignee: Ball Corporation, Broomfield, CO (US)

( * ) Notice: Subject to any disclaimer, the term of this patent is extended or adjusted under 35 U.S.C. 154(b) by 71 days.

(21) Appl. No.: 14/246,728

(22) Filed: Apr. 7, 2014

(65) Prior Publication Data
US 2014/0298641 A1    Oct. 9, 2014

Related U.S. Application Data

(60) Provisional application No. 61/809,952, filed on Apr. 9, 2013.

(51) Int. Cl.
*B21C 23/00* (2006.01)
*B21C 23/18* (2006.01)
(Continued)

(52) U.S. Cl.
CPC ........... *B21C 23/002* (2013.01); *B21C 23/186* (2013.01); *B21D 51/2615* (2013.01);
(Continued)

(58) Field of Classification Search
CPC ........ B21C 23/002; B21C 23/01; B21C 23/18; B21C 23/183; B21C 23/186; B21C 23/20; B21C 23/218; B21D 51/2615; B21D 51/24; B21D 51/38; B23P 15/00; B65D 41/045; B65D 41/0464; B65D 41/10; B65D 41/40; B65D 35/06; B65D 45/32; B65D 2501/0009; C22C 1/00; C22C 1/026; C22C 1/06; C22C 21/00; Y10T 29/49988; Y10T 29/49989; Y10T 29/49991; Y10T 29/5184
(Continued)

(56) References Cited

U.S. PATENT DOCUMENTS

| | | | |
|---|---|---|---|
| 3,029,507 A | 4/1962 | Gaggini | |
| 3,232,260 A | 2/1966 | Siemonsen | |

(Continued)

FOREIGN PATENT DOCUMENTS

| | | |
|---|---|---|
| CA | 1252649 | 4/1989 |
| CA | 2133312 | 7/1994 |

(Continued)

OTHER PUBLICATIONS

Wikipedia.org article titled "Impact Extrusion" using Way Back Machine (http://web.archive.org) publically available on Dec. 9, 2009.*

(Continued)

*Primary Examiner* — Peter DungBa Vo
*Assistant Examiner* — Joshua D Anderson
(74) *Attorney, Agent, or Firm* — Sheridan Ross P.C.

(57) ABSTRACT

The present invention relates generally to forming a threaded neck in a metal bottle manufactured by a process known as impact extrusion. More specifically, the present invention relates to methods, apparatus and alloy compositions used in the impact extrusion manufacturing of containers and other articles with sufficient strength characteristics to allow threading the container necks to receive a threaded closure on the threaded neck.

21 Claims, 15 Drawing Sheets

(51) Int. Cl.

| | | |
|---|---|---|
| *B23P 15/00* | (2006.01) | |
| *B65D 1/02* | (2006.01) | |
| *B65D 41/04* | (2006.01) | |
| *C22C 1/00* | (2006.01) | |
| *B21D 51/26* | (2006.01) | |
| *C22C 21/00* | (2006.01) | |
| *B21H 3/04* | (2006.01) | |

(52) U.S. Cl.
 CPC ......... *B65D 1/0246* (2013.01); *B65D 41/045* (2013.01); *B65D 41/0464* (2013.01); *C22C 1/00* (2013.01); *C22C 21/00* (2013.01); *B21H 3/04* (2013.01); *B23P 15/00* (2013.01); *Y10T 29/49988* (2015.01); *Y10T 29/49989* (2015.01)

(58) Field of Classification Search
 USPC .... 72/253.1, 256, 267, 273.5, 367.1–370.21, 72/700, 715; 29/527.5, 527.6, 527.7
 See application file for complete search history.

(56) References Cited

U.S. PATENT DOCUMENTS

| | | | |
|---|---|---|---|
| 3,812,646 A | 5/1974 | Baldyga et al. | |
| 4,243,438 A | 1/1981 | Yanagida et al. | |
| 4,260,419 A | 4/1981 | Robertson | |
| 4,282,044 A | 8/1981 | Robertson et al. | |
| 4,318,755 A | 3/1982 | Jeffrey et al. | |
| 4,403,493 A | 9/1983 | Atkinson | |
| 4,411,707 A | 10/1983 | Brennecke et al. | |
| 4,693,108 A | 9/1987 | Traczyk et al. | |
| 4,732,027 A | 3/1988 | Traczyk et al. | |
| 4,823,537 A | 4/1989 | Duke | |
| 5,102,705 A | 4/1992 | Yammoto et al. | |
| 5,104,465 A | 4/1992 | McAuliffe et al. | |
| 5,110,545 A | 5/1992 | McAuliffe et al. | |
| 5,138,858 A | 8/1992 | Johnson et al. | |
| 5,293,765 A | 3/1994 | Nussbaum-Pogacnik | |
| 5,355,710 A | 10/1994 | Diekhoff | |
| 5,362,341 A | 11/1994 | Palmer et al. | |
| 5,394,727 A | 3/1995 | Diekhoff et al. | |
| 5,448,903 A | 9/1995 | Johnson | |
| 5,469,729 A | 11/1995 | Hager | |
| 5,486,243 A | 1/1996 | Hashiguchi et al. | |
| 5,487,295 A | 1/1996 | Diekhoff et al. | |
| 5,503,690 A | 4/1996 | Wade et al. | |
| 5,522,248 A | 6/1996 | Diekhoff et al. | |
| 5,522,950 A | 6/1996 | Bartges et al. | |
| 5,551,997 A | 9/1996 | Marder et al. | |
| 5,571,347 A | 11/1996 | Bergsma | |
| 5,572,893 A | 11/1996 | Goda et al. | |
| 5,704,240 A | 1/1998 | Jordan | |
| 5,713,235 A | 2/1998 | Diekhoff | |
| 5,718,352 A | 2/1998 | Diekhoff et al. | |
| 5,769,331 A | 6/1998 | Yamagishi et al. | |
| 5,772,802 A | 6/1998 | Sun et al. | |
| 5,778,723 A | 7/1998 | Diekhoff | |
| 5,822,843 A | 10/1998 | Diekhoff et al. | |
| 6,010,026 A | 1/2000 | Diekhoff et al. | |
| 6,010,028 A | 1/2000 | Jordan et al. | |
| 6,100,028 A | 8/2000 | Cole et al. | |
| 6,126,034 A | 10/2000 | Borden et al. | |
| 6,171,362 B1 | 1/2001 | Osumi et al. | |
| 6,355,090 B1 | 3/2002 | Ohyama et al. | |
| 6,368,427 B1 | 4/2002 | Sigworth | |
| 6,543,636 B1 | 4/2003 | Flecheux et al. | |
| 6,607,615 B1 | 8/2003 | Bekki et al. | |
| 6,627,012 B1 | 9/2003 | Tack et al. | |
| 6,630,037 B1 | 10/2003 | Sawada et al. | |
| 6,666,933 B2 | 12/2003 | Roberts et al. | |
| 6,676,775 B2 | 1/2004 | Barth et al. | |
| 6,945,085 B1 | 9/2005 | Goda | |
| 6,959,830 B1 | 11/2005 | Kanou et al. | |
| 7,117,704 B2 | 10/2006 | Ogura et al. | |
| 7,140,223 B2 | 11/2006 | Chupak | |
| 7,147,123 B2 | 12/2006 | Yamashita | |
| 7,171,840 B2 | 2/2007 | Kanou et al. | |
| 7,294,213 B2 | 11/2007 | Warner et al. | |
| 7,520,044 B2* | 4/2009 | Bulliard | C22C 21/02 |
| | | | 148/440 |
| 7,555,927 B2 | 7/2009 | Hanafusa et al. | |
| 7,588,808 B2 | 9/2009 | Hutchinson et al. | |
| 7,666,267 B2 | 2/2010 | Benedictus et al. | |
| 7,713,363 B2 | 5/2010 | Sano et al. | |
| 7,798,357 B2 | 9/2010 | Hanafusa et al. | |
| 7,824,750 B2 | 11/2010 | Takegoshi et al. | |
| 8,037,728 B2 | 10/2011 | Hosoi | |
| 8,037,734 B2 | 10/2011 | Hanafusa et al. | |
| 8,091,402 B2 | 1/2012 | Hanafusa et al. | |
| 8,132,439 B2 | 3/2012 | Hanafusa et al. | |
| 8,132,687 B2 | 3/2012 | Fedusa et al. | |
| 8,313,003 B2 | 11/2012 | Riley et al. | |
| 8,349,419 B2 | 1/2013 | Nishida et al. | |
| 8,360,266 B2 | 1/2013 | Adams et al. | |
| 8,505,350 B2 | 8/2013 | Marshall et al. | |
| 9,227,748 B2 | 1/2016 | Nakagawa et al. | |
| 9,327,899 B2 | 5/2016 | Greenfield et al. | |
| 2001/0003292 A1 | 6/2001 | Sun et al. | |
| 2001/0031376 A1 | 10/2001 | Fulton et al. | |
| 2004/0025981 A1 | 2/2004 | Tack et al. | |
| 2004/0035871 A1 | 2/2004 | Chupak | |
| 2004/0140237 A1 | 7/2004 | Brownewell | |
| 2004/0173560 A1 | 9/2004 | Chupak | |
| 2004/0213695 A1 | 10/2004 | Ferreira et al. | |
| 2005/0067365 A1 | 3/2005 | Hanafusa et al. | |
| 2005/0127077 A1 | 6/2005 | Chupak | |
| 2007/0062952 A1 | 3/2007 | Kobayashi et al. | |
| 2007/0295051 A1 | 12/2007 | Myers et al. | |
| 2008/0011702 A1 | 1/2008 | Walsh | |
| 2008/0022746 A1 | 1/2008 | Myers et al. | |
| 2008/0041501 A1 | 2/2008 | Platek et al. | |
| 2008/0163663 A1 | 7/2008 | Hankey et al. | |
| 2008/0181812 A1 | 7/2008 | Ferreira et al. | |
| 2008/0299001 A1 | 12/2008 | Langlais et al. | |
| 2009/0220714 A1 | 9/2009 | Nishida et al. | |
| 2009/0277862 A1 | 11/2009 | Masuda et al. | |
| 2010/0065528 A1 | 3/2010 | Hanafusa et al. | |
| 2010/0199741 A1 | 8/2010 | Myers et al. | |
| 2010/0326946 A1 | 12/2010 | Hanafusa et al. | |
| 2011/0113732 A1 | 5/2011 | Adams et al. | |
| 2011/0164948 A1 | 7/2011 | Marshall et al. | |
| 2012/0024813 A1 | 2/2012 | Nakagawa et al. | |
| 2012/0031913 A1 | 2/2012 | Moore et al. | |
| 2012/0269602 A1 | 10/2012 | Hanafusa et al. | |
| 2013/0068352 A1* | 3/2013 | Siles | C22C 21/00 |
| | | | 148/552 |
| 2013/0202477 A1 | 8/2013 | Zajac et al. | |
| 2015/0013416 A1 | 1/2015 | Hosoi | |

FOREIGN PATENT DOCUMENTS

| | | |
|---|---|---|
| CA | 2169743 | 2/1995 |
| CA | 2206483 | 9/1999 |
| CA | 2302557 | 9/2001 |
| CA | 2655925 | 1/2008 |
| CA | 2662199 | 3/2008 |
| CA | 2638403 | 10/2009 |
| CN | 101294255 | 10/2008 |
| CN | 100515875 | 7/2009 |
| CN | 101888907 | 11/2010 |
| CN | 101985707 | 3/2011 |
| DE | 60206036 | 6/2006 |
| EP | 0721384 | 7/1996 |
| EP | 1531952 | 8/2006 |
| EP | 1731239 | 12/2006 |
| EP | 2119515 | 11/2009 |
| EP | 2146907 | 1/2010 |
| EP | 2531409 | 12/2012 |
| EP | 2646328 | 10/2013 |
| EP | 2835188 | 2/2015 |
| EP | 2955131 | 12/2015 |
| GB | 971258 | 9/1964 |
| GB | 1215648 | 12/1970 |

(56) References Cited

FOREIGN PATENT DOCUMENTS

| | | |
|---|---|---|
| GB | 1598428 | 9/1981 |
| JP | H10-203573 | 8/1998 |
| JP | H11-293363 | 10/1999 |
| JP | 2000-063973 | 2/2000 |
| JP | 2001115226 | 4/2001 |
| JP | 2001-172728 | 6/2001 |
| JP | 2001-181768 | 7/2001 |
| JP | 2002-137032 | 5/2002 |
| JP | 2002-173717 | 6/2002 |
| JP | 2002-302137 | 10/2002 |
| JP | 3408213 | 5/2003 |
| JP | 2003-205924 | 7/2003 |
| JP | 2003268460 | 9/2003 |
| JP | 2003334631 | 11/2003 |
| JP | 2004-210403 | 7/2004 |
| JP | 2005-96843 | 4/2005 |
| JP | 3665002 | 6/2005 |
| JP | 2005193272 | 7/2005 |
| JP | 2005-263230 | 9/2005 |
| JP | 2005-280768 | 10/2005 |
| JP | 2006-62755 | 3/2006 |
| JP | 2006-62756 | 3/2006 |
| JP | 3754076 | 3/2006 |
| JP | 3886329 | 2/2007 |
| JP | 2007-106621 | 4/2007 |
| JP | 4115133 | 7/2008 |
| JP | 4159956 | 10/2008 |
| JP | 4173388 | 10/2008 |
| JP | 2009108421 | 5/2009 |
| JP | 2010-202908 | 9/2010 |
| JP | 4564328 | 10/2010 |
| JP | 2011-116456 | 6/2011 |
| JP | 4723762 | 7/2011 |
| JP | 4757022 | 8/2011 |
| JP | 2011-208273 | 10/2011 |
| JP | 2011-526232 | 10/2011 |
| JP | 2012-192984 | 10/2012 |
| JP | 5290569 | 9/2013 |
| JP | 5323757 | 10/2013 |
| JP | 2013-244996 | 12/2013 |
| JP | 5597333 | 10/2014 |
| JP | 5855233 | 2/2016 |
| JP | 5887340 | 3/2016 |
| RU | 2221891 | 1/2004 |
| WO | WO 92/04477 | 3/1992 |
| WO | WO 93/17864 | 9/1993 |
| WO | WO 98/46488 | 10/1998 |
| WO | WO 99/32363 | 7/1999 |
| WO | WO 99/37826 | 7/1999 |
| WO | WO 00/03933 | 1/2000 |
| WO | WO 2004/094679 | 11/2004 |
| WO | WO 2008/002899 | 1/2008 |
| WO | WO 2010/117009 | 10/2010 |
| WO | WO 2011/078057 | 6/2011 |
| WO | WO 2012/133391 | 10/2012 |
| WO | WO 2012/144490 | 10/2012 |

OTHER PUBLICATIONS

International Search Report and Written Opinion for International (PCT) Patent Application No. PCT/US201/033182, mailed Nov. 25, 2014, 11 pages.
U.S. Appl. No. 14/212,545, filed Mar. 14, 2014, Robinson et al.
U.S. Appl. No. 14/301,018, filed Jun. 10, 2014, Carreras.
U.S. Appl. No. 61/937,125, filed Feb. 7, 2014, Ross et al.
Fisher et al. "Recycling—The Effect on Grain Refinement of Commercial Aluminium Alloys," London & Scandinavian Metallurgical Co Limited, 122nd TMS Annual Meeting & Exhibition, Feb. 21-25, 1993, 6 pages.
Goltz "Aluminum Bottles are Successful," University of Wisconson, 2005, 5 pages [retrieved from: http://www2.uwstout.edu/content/rs/2005/article6.pdf].
International Search Report and Written Opinion for International Patent Application No. PCT/US12/55390, mailed Nov. 21, 2012, 8 pages.
International Preliminary Report on Patentability for International (PCT) Patent Application No. PCT/US2012/055390, mailed Mar. 27, 2014 8 pages.
Cui et al. "Recycling of automotive aluminum," Transactions of Nonferrous Metals Society of China, Nov. 2010, vol. 20, No. 11, pp. 2057-2063.
Guley et al. "Direct recycling of 1050 aluminum alloy scrap material mixed with 6060 aluminum alloy chips by hot extrusion," International Journal of Material Forming, Apr. 2010, vol. 3, No. Suppl. 1, pp. 853-856.
Herbert, "Manufacturing Processes," Prentice-Hall, Inc., Englewood Cliffs, NJ, excerpts from pp. 548-553, 562-563, 1979, 11 pages.
Tekkaya et al. "Hot profile extrusion of AA-6060 aluminum chips," Journal of Materials Processing Technology, Apr. 2009, vol. 209, No. 7, pp. 3343-3350.
International Preliminary Report on Patentability for International (PCT) Patent Application No. PCT/US2014/033182, mailed Oct. 22, 2015, 8 pages.
Official Action for U.S. Appl. No. 13/617,119, mailed Jun. 8, 2016, 8 pages.

* cited by examiner

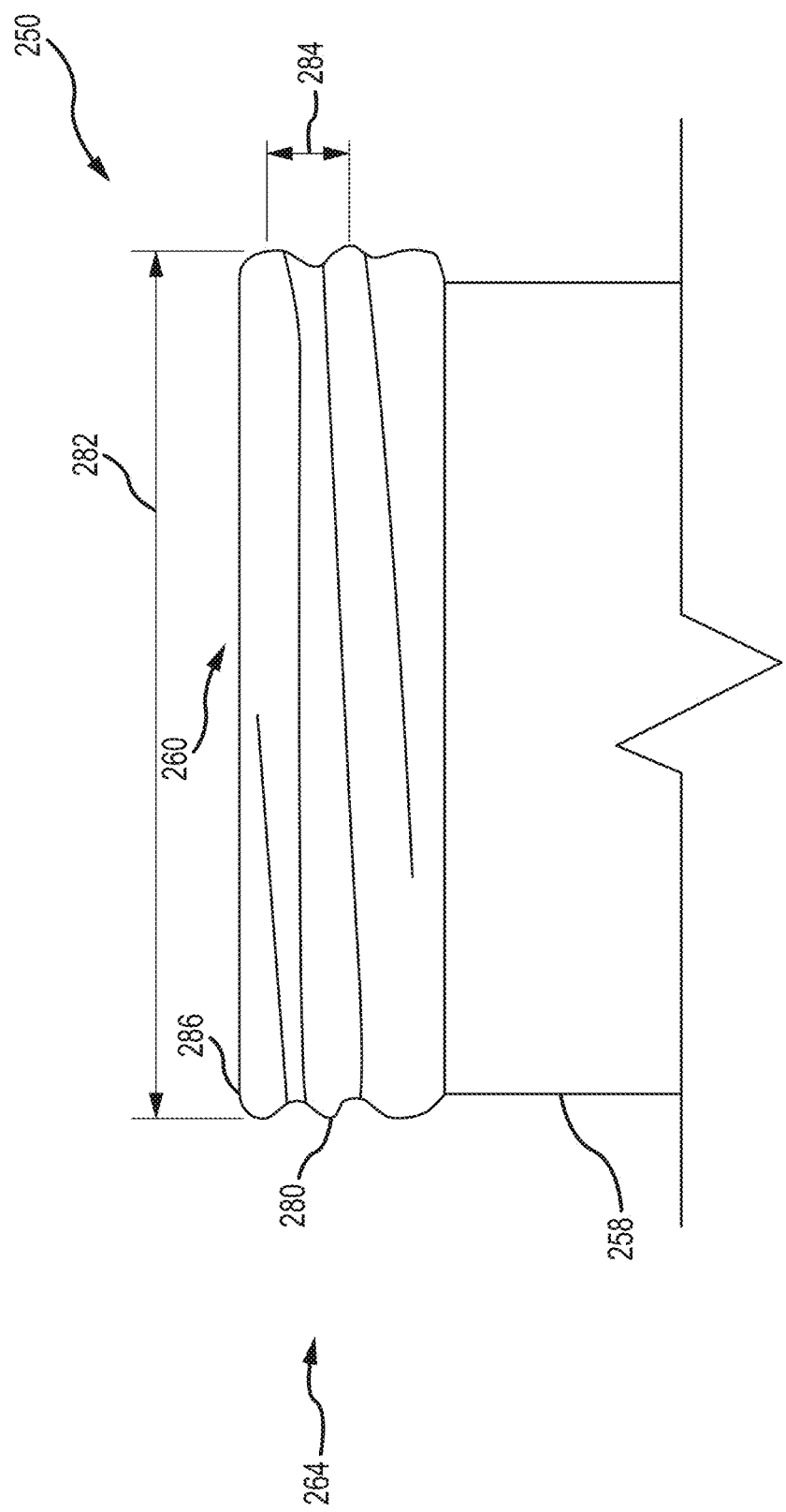

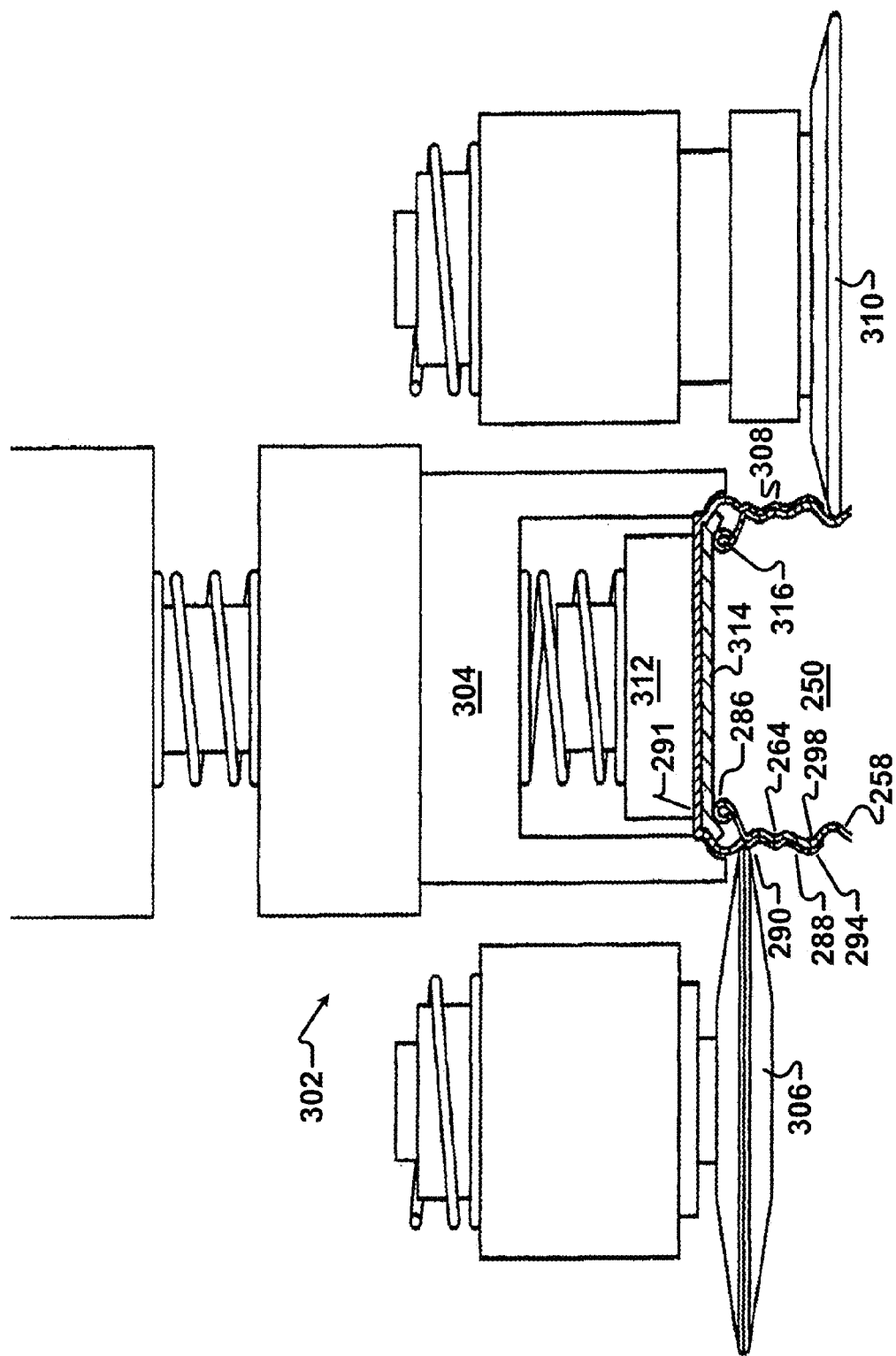

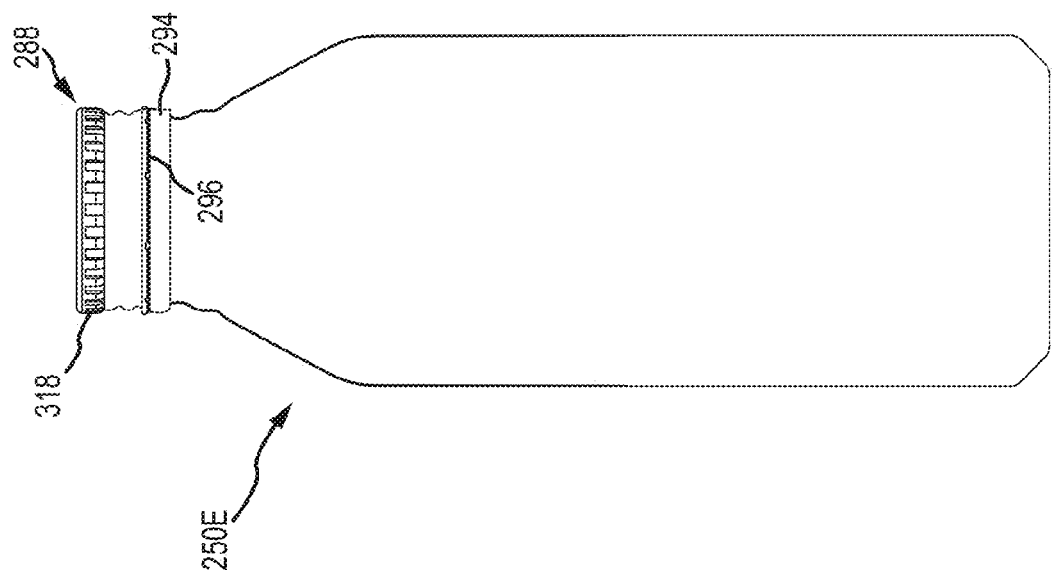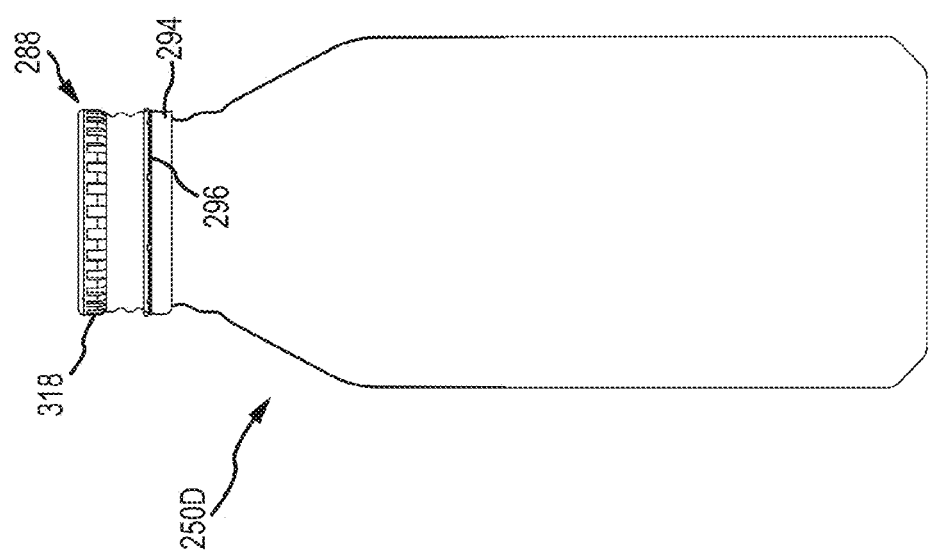
FIG.8

ALUMINUM IMPACT EXTRUDED BOTTLE WITH THREADED NECK MADE FROM RECYCLED ALUMINUM AND ENHANCED ALLOYS

CROSS-REFERENCE TO RELATED APPLICATIONS

This application claims priority under 35 U.S.C. §119(e) to U.S. Provisional Patent Application Ser. No. 61/809,952 filed Apr. 9, 2013, which is incorporated herein in its entirety by reference.

FIELD OF THE INVENTION

The present invention relates generally to forming a threaded neck in a metallic bottle manufactured by a process known as impact extrusion. More specifically, the present invention relates to methods, apparatus and alloy compositions used in the impact extrusion manufacturing of containers and other articles with sufficient strength characteristics to allow threading of the container neck to receive threaded closures.

BACKGROUND

Generally, the configuration and design of a container affects the level to which end consumers, as well as bottlers, manufacturers, distributors, shippers, and retailers, hereinafter referred to collectively as "the bottling industry," are satisfied with a container. Aluminum bottles offer the bottling industry and consumers many benefits. Aluminum bottles provide ideal surfaces to decorate with brand names, logos, designs, product information, and/or other preferred indicia and thus offer bottlers, distributors, and retailers an ability to stand out at the point of sale. Aluminum bottles have a strength-to-weight ratio advantage which enables higher stacking than comparable glass bottles. The increased durability of aluminum bottles also reduces the number of containers damaged during processing and shipping, resulting in further savings. Additionally, aluminum bottles are lighter than glass bottles resulting in energy savings during shipment. Finally, recycling aluminum bottles is easier because labels and other indicia are printed directly onto the aluminum bottles while glass and plastic bottles typically have labels that must be separated during the recycling process.

Aluminum beverage bottles are particularly attractive to consumers because of the convenience they offer. The light weight of aluminum bottles makes them easier to carry. Aluminum bottles are particularly suitable for use in public places and outdoors because they are durable, safe, and give effective protection from light and air which may negatively affect the quality and taste of the beverage contained in the aluminum bottle. In addition, aluminum bottles cool down faster than beverage containers made of other materials resulting in colder beverages faster. Glass bottles do not offer the same convenience because they are heavier than aluminum bottles and are easier to break. Further, some public facilities and parks prohibit glass bottles because they pose a safety risk when broken.

Aluminum beverage bottles are known in the container industry and may be formed using an impact extrusion process. Impact extrusion is a process utilized to make metallic containers and other articles with unique shapes. The products are typically made from a softened metal slug comprised of steel, magnesium, copper, aluminum, tin, and lead and other alloys. The container is formed inside a confining die from a cold slug which is contacted by a punch. The force from the punch deforms the metal slug around an outer diameter of the punch and the inner diameter of the confining die. After the initial shape is formed, the container or other apparatus is removed from the punch with a counter-punch ejector, and other necking and shaping tools are used to form the device to a preferred shape.

In a conventional impact extrusion process, almost pure or "virgin" aluminum is used due to its unique physical characteristics, and is commonly referred to as "1070" or "1050" aluminum which is comprised of at least about 99.5% of pure aluminum. Current commercial impact extruded (IE) containers made with a 1070 or 1050 aluminum alloy are very soft and have low mechanical properties and thus require thick walls. IE containers for aerosols and other pressure vessels require high strength and thus use thicker gage and heavier materials than traditional aluminum beverage containers. Because of the thickness and strength requirements of these containers, the cost to manufacture the containers may be significantly higher than the cost to manufacture conventional metal beverage containers which generally utilize 3104 aluminum alloy. The thickness of traditional IE containers also makes the manufacture of integral threads more complex. Further, the soft nature of aluminum alloy used for traditional IE containers is too soft to form integral threads which are sufficiently strong to close with a threaded closure such as a roll on pilfer proof (ROPP) closure. Tests of integral threads formed on IE bottles manufactured from standard alloys show that the threaded area will collapse at a substantially lower load force compared to the threads of a container made through a draw and ironing process.

The manufacture of drawn and ironed (D&I) aluminum containers using 3104 aluminum alloy results in a considerable amount of scrap aluminum material. The scrap aluminum is typically collected and recycled. However, in the past, conventional impact extrusion alloys were not hard or strong enough to be used to form IE containers with a threaded neck. Using a percentage of scrap aluminum from the D&I process blended with conventional impact extrusion alloys could produce a sufficiently strong threaded container from impact extrusion that would result in material cost savings for bottling industry and reduce the environmental footprint of the threaded container.

To meet the need of an IE beverage container with a thread for a ROPP closure, the commercial container industry typically attaches threads to the neck of an IE beverage container after the container has been formed. These external threads are usually made of plastic or metal and in some cases are known as "outserts." These external threads have several shortcomings, including increased cost, complexity of the manufacturing process, and adverse capping performance characteristics including caps spinning on the container neck and container leaking around the cap and/or outsert. Thus, there is a significant need for an IE aluminum container which is comprised of recycled aluminum content which is sufficiently hard and rigid to allow for the formation of a threaded neck to receive a selectively removable closure such as a ROPP closure.

SUMMARY OF THE INVENTION

Accordingly, the present invention contemplates the use of a higher strength aluminum alloy which may be used during an impact extrusion process to form containers with integral threaded necks having sufficient mechanical strength to close with a roll on pilfer proof (ROPP) closure. Preferably, the aluminum alloy is comprised at least partly from a recycled scrap material such as aluminum beverage containers. The present invention allows for the use of IE containers with thinner walls than are possible with an IE container made from 1070 or 1050 aluminum alloy IE methods. Thus, for the first time, it is possible to manufacture a lower cost, thin walled, IE aluminum container body with a high performance integral thread for capping pressurized beverage containers with a threaded closure.

Thus, in one embodiment of the present invention, a container strong enough for threading is formed in an impact extrusion process using unique alloys specifically adapted for use in an IE process, said unique alloys blended from various scrap materials with other virgin metals. Alternatively or in addition, alloying elements, such as but not limited to magnesium, may be added to the alloy to refine the chemical composition of the recycled aluminum alloy of the present invention.

In one embodiment of the present invention, a novel alloy is provided in the initial form of a metal slug and used to form a metallic container in an impact extrusion process, wherein the metallic container is of sufficient strength to thread the neck. The alloy in one embodiment has a composition comprised of a recycled 3105 or 3104 aluminum, and a relatively pure 1070 aluminum to form a novel recycled alloy. In another embodiment, a recycled aluminum alloy which utilizes 40% of 3104 alloy is blended with a 1070 alloy, and which comprises the following composition: approximately 98.47% aluminum; approximately 0.15% Si; approximately 0.31% Fe; approximately 0.09% Cu; approximately 0.41% Mn; approximately 0.49% Mg; approximately 0.05% Zn; approximately 0.02% Cr; and approximately 0.01% Ti. In still another embodiment, 60% to 80% of a recycled aluminum is blended with a 1070 alloy to form a recycled aluminum alloy. The recycled aluminum comprises approximately 0.26% Si; approximately 0.53% Fe; approximately 0.16% Cu; approximately 0.84% Mn; approximately 0.6% Mg; approximately 0.12% Zn; approximately 0.02% Cr; and approximately 0.02% Ti. The recycled aluminum alloy comprises between about 97.70% aluminum and about 98.05% aluminum; between about 0.16% Si and about 0.24% Si; between about 0.37% Fe and about 0.48% Fe; between about 0.08% Cu and about 0.15% Cu; between about 0.48% Mn and about 0.71% Mn; between about 0.34% Mg and about 0.52% Mg; between about 0.06% Zn and about 0.12% Zn; between about 0.01% Cr and about 0.04% Cr; and between about 0.00% Ti and about 0.04% Ti.

It is another aspect of the present invention to provide a method of manufacturing an impact extruded metallic bottle with sufficient strength characteristics to thread a neck portion of the metallic bottle. The method generally comprises (1) forming a slug with an aluminum alloy; (2) deforming the slug into a preferred shape in an impact extrusion process to form the metallic bottle; and (3) forming threads on the neck portion of the metallic bottle, the threads adapted to receive a threaded closure which can be selectively opened and closed. The method may further comprise: (4) adding a titanium boride to the aluminum alloy; (5) forming individual slugs from a slab formed from a casting apparatus; (6) annealing the individual slugs in a continuous annealing process, and (7) finishing the slugs by shot blasting to increase the surface area of the slugs. The aluminum alloy in one embodiment is comprised of a scrap metal of at least one of a 3104, a 3004, a 3003, a 3103, a 3013 and a 3105 aluminum alloy blended with a relatively pure aluminum alloy. In one embodiment, the aluminum alloy is blended from approximately 60% of a scrap aluminum alloy and approximately 40% of a 1070 aluminum alloy, wherein the scrap aluminum alloy comprises: between about 0.20 wt. % Si and about 0.32 wt. % Si; between about 0.47 wt. % Fe and about 0.59 wt. % Fe; between about 0.10 wt. % Cu and about 0.22 wt. % Cu; between about 0.78 wt. % Mn and about 0.90 wt. % Mn; between about 0.54 wt. % Mg and about 0.66 wt. % Mg; between about 0.06 wt. % Zn and about 0.18 wt. % Zn; between about 0.00 wt. % Cr and about 0.08 wt. % Cr; and between about 0.00 wt. % Ti and about 0.08 wt. % Ti. In a preferred embodiment, the scrap aluminum alloy comprises about 0.26% Si; about 0.53% Fe; about 0.16% Cu; about 0.84% Mn; about 0.60% Mg; about 0.12% Zn; about 0.02% Cr; and about 0.02% Ti. The aluminum alloy comprises between about 98.15% aluminum and about 98.50% aluminum; between about 0.16% Si and about 0.20% Si; between about 0.37% Fe and about 0.41% Fe; between about 0.08% Cu and about 0.12% Cu; between about 0.48% Mn and about 0.54% Mn; between about 0.34% Mg and about 0.40% Mg; between about 0.06% Zn and about 0.10% Zn; between about 0.01% Cr and about 0.04% Cr; and between about 0.00% Ti and about 0.04% Ti. In one embodiment, the aluminum alloy consists of: about 98.33% aluminum; about 0.18% Si; about 0.39% Fe; about 0.10% Cu; about 0.51% Mn; about 0.37% Mg; about 0.08% Zn; about 0.02% Cr; and about 0.02% Ti.

In one embodiment, the threads have an exterior diameter of between approximately 1.4 inches and approximately 1.6 inches. In a preferred embodiment, the exterior diameter of the threads is between approximately 1.44 inches and approximately 1.54 inches. In another embodiment, the threads have an exterior diameter between approximately 1.2 inches and approximately 1.4 inches. In a preferred embodiment, the exterior diameter of the threads is between approximately 1.24 inches and approximately 1.34 inches. In yet another embodiment, the threads have an exterior diameter between approximately 1.0 inches and approximately 1.2 inches. In a preferred embodiment, the exterior diameter of the threads is between approximately 1.05 inches and approximately 1.15 inches. In still another embodiment, the exterior diameter of the threads is between approximately 1.0 inches and approximately 1.6 inches. In one embodiment, the threads have a pitch, or distance from a crest of one thread to a crest of another thread, of between about 0.10 inches and about 0.15 inches. In another embodiment, the pitch is approximately 0.125 inches, or approximately eight threads per inch. In another embodiment, a body portion of the metallic bottle has a thickness between about 0.0098 inches and about 0.0155 inches. In a more preferred embodiment, the bottle has a thickness between about 0.0135 inches to about 0.0145 inches. In still another embodiment, the metallic bottle has a diameter of between approximately 2.6 inches and approximately 2.85 inches. In a preferred embodiment, the diameter of the metallic bottle may be between 2.64 and 2.75 inches. In one embodiment, the metallic bottle has a height between approximately 6.2 inches and approximately 7.25 inches. In another embodiment, the metallic bottle has a height between about 6.2 inches and about 6.3 inches. In still another embodiment, the height of the metallic bottle is between about 7.1 inches and about 7.25 inches.

It is another aspect of the present invention to provide a method of impact extruding and threading a neck portion of a metallic bottle formed of a recycled aluminum alloy. The method includes, but is not limited to: (1) providing scrap aluminum material; (2) melting the scrap aluminum material with a 1070 aluminum alloy to form the recycled aluminum alloy, wherein the recycled aluminum alloy comprises: about 98.33% aluminum, about 0.18% Si, about 0.39% Fe, about 0.10% Cu, about 0.51% Mn, about 0.37% Mg, about 0.08% Zn, about 0.02% Cr, and about 0.02% Ti; (3) casting the recycled aluminum alloy into a slab; (4) rolling the slab to a specified thickness of between about 0.1181 inches to about 0.5512 inches; (5) cooling the slab to a predetermined temperature at an ambient temperature of between about 59° F. to about 122° F.; (6) punching slugs from the cooled slab; (7) annealing the slugs, wherein a peak temperature of the slugs is between about 842° F. to about 1058° F.; (8) impact extruding a slug to form an extruded tube; (9) forming a bottom dome portion on the extruded tube; (10) necking the extruded tube to form the aluminum bottle, the aluminum bottle having the bottom dome portion, a body portion, the neck portion extending upwardly from the body portion, and an opening positioned on an uppermost portion of the neck portion; (11) trimming at least a portion of the uppermost portion of the neck portion; and (12) forming threads in the neck portion of the metallic bottle, the threads adapted to threadably engage a closure. In one embodiment, the slab is cooled for between about 4 hours to about 8 hours. In another embodiment, the slab is cooled for longer than 24 hours. In still another embodiment, the slab is cooled for longer than 1 week.

Forming threads in the neck portion generally comprises positioning the metallic bottle in a chuck to support the metallic bottle and hold the metallic bottle in a predetermined position. An inner core piece of a thread forming device is positioned in the opening of the metallic bottle in contact with an interior surface portion of the neck of the metallic bottle. An outer core piece of the thread forming device is positioned in contact with an exterior surface of the neck of the metallic bottle. A compressive force is applied to the neck of the metallic bottle by thread forming surfaces of the inner core piece and the outer core piece. The thread forming surfaces of the inner and outer core pieces have concave and convex portions predetermined to form threads of a predetermined size and geometry on the metallic bottle. The thread forming device is rotated around an axial center of the metallic bottle so that the inner core piece and the outer core piece move around a circumference of the neck of the metallic bottle.

The method may further comprise: (13) wall ironing the extruded tube to increase the thickness of at least a portion of the neck portion, wherein the thickness of the at least a portion of neck region is greater than a thickness of the body portion of the metallic bottle, and wherein the thickness of the at least a portion of the neck region is about 0.0125 inches and about 0.0155 inches; and (14) sealing the opening of the metallic bottle with a ROPP closure. The ROPP closure generally comprises a top portion, a generally cylindrical body portion extending downwardly from the top portion, a detachable pilfer band formed on a lowermost portion of the cylindrical body portion, an open aperture facing downward, and a liner in an interior top portion of the ROPP closure. The cylindrical body portion of the ROPP closure used to seal the opening of the metallic bottle is initially unthreaded. Sealing the metallic bottle generally comprises: placing the ROPP closure over the threads in the neck portion of the metallic bottle; pressing the ROPP closure downwardly onto sealing surfaces formed on the uppermost portion of the neck portion of the metallic bottle, compressing a liner of the ROPP closure between the sealing surfaces and the top portion of the ROPP closure; pressing a thread roller against an exterior surface of the cylindrical body portion of the ROPP closure, wherein the thread roller applies a compressive force to the cylindrical body portion and rotates around the ROPP closure to form threads in the cylindrical body portion; and pressing a pilfer roller against an exterior surface of the pilfer band to prevent the pilfer band from being removed from the neck portion of the metallic bottle when the ROPP closure is removed from the metallic bottle.

Impact extruding the slug may comprise: placing the slug in a die having a conical shape; and impacting the slug with a steel punch having a predetermined shape, wherein the extruded tube is extruded backwards out of the die. In one embodiment the die has a Vickers hardness (HV) of between approximately 920 HV and approximately 1080 HV. In a more preferred embodiment, the die has a hardness of between approximately 970 HV and approximately 1030 HV. In a still more preferred embodiment, the die has a hardness of between approximately 990 HV and approximately 1010 HV. In one embodiment the punch has a hardness of between approximately 600 HV and approximately 760 HV. In a more preferred embodiment, the punch has a hardness of between approximately 640 HV and approximately 720 HV. In a still more preferred embodiment, the punch has a hardness of between approximately 670 HV and approximately 690 HV. In one embodiment, the slug has a diameter of between approximately 1.61 inches and approximately 1.91 inches. In a more preferred embodiment, the slug has a diameter of between approximately 1.71 inches and approximately 1.81 inches. In a still more preferred embodiment, the slug has a diameter of between approximately 1.75 inches and approximately 1.766 inches. In one embodiment, the slug has a height of between about 0.17 inches and about 0.27 inches. In another embodiment, the slug has a height of between about 0.20 inches and about 0.235 inches. In a still more preferred embodiment, the slug has a height of between about 0.216 inches and about 0.217. In one embodiment, the slug has a mass of between approximately 0.69 ounces and approximately 0.875 ounces. In a more preferred embodiment, the slug has a mass of between approximately 0.7 ounces and approximately 0.865 ounces. In a still more preferred embodiment, the slug has a mass of between about 0.740 ounces and about 0.825 ounces.

In another embodiment, the aluminum alloy comprises: between about 97.70 wt. % aluminum and about 98.05 wt. % aluminum; between about 0.20 wt. % Si and about 0.24 wt. % Si; between about 0.44 wt. % Fe and about 0.48 wt. % Fe; between about 0.11 wt. % Cu and about 0.15 wt. % Cu; between about 0.65 wt. % Mn and about 0.71 wt. % Mn; between about 0.46 wt. % Mg and about 0.52 wt. % Mg; between about 0.08 wt. % Zn and about 0.12 wt. % Zn; between about 0.01 wt. % Cr and about 0.04 wt. % Cr; and between about 0.00 wt. % Ti and about 0.04 wt. % Ti.

The threads are formed by a thread forming device, the thread forming device comprising: a chuck to hold the metallic bottle in a predetermined position; an inner core piece with a first thread forming surface operable to apply a force to an interior surface of the neck portion of the metallic bottle; and an outer core piece with a second thread forming surface operable to apply a force to an exterior surface of the neck portion of the metallic bottle, wherein the thread forming device is operable to rotate around an axial center of the metallic bottle.

Still another aspect of the present invention is a metallic bottle with a threaded neck, the metallic bottle generally comprising: a bottom dome portion; a body portion extending upwardly from the bottom dome portion; a neck portion extending upwardly from the body portion; threads formed on an exterior surface of the neck portion; and an opening positioned on an uppermost portion of the neck portion. Sealing surfaces are formed on the uppermost portion of the metallic bottle and a pilfer band skirt is formed on the neck portion of the metallic bottle.

The metallic bottle is comprised of a recycled aluminum alloy, the recycled aluminum alloy comprising: between about 97.70 wt. % aluminum and about 98.50 wt. % aluminum, between about 0.16 wt. % Si and about 0.24 wt. % Si, between about 0.37 wt. % Fe and about 0.48 wt. % Fe, between about 0.08 wt. % Cu and about 0.15 wt. % Cu, between about 0.48 wt. % Mn and about 0.71 wt. % Mn, between about 0.34 wt. % Mg and about 0.52 wt. % Mg, between about 0.06 wt. % Zn and about 0.12 wt. % Zn, between about 0.01 wt. % Cr and about 0.04 wt. % Cr, and between about 0.00 wt. % Ti and about 0.04 wt. % Ti. The threaded neck of the metallic bottle has a predetermined geometry adapted to receive a ROPP closure, the threads adapted to receive the ROPP closure having an interior diameter of about 1.5 inches. In another embodiment, the threads are adapted to receive the ROPP closure having an interior diameter of about 1.3 inches. In yet another embodiment, the threads are adapted to receive the ROPP closure having an interior diameter of about 1.1 inches. In one embodiment, the threads have a pitch of between about 0.10 inches and about 0.15 inches. In another embodiment, the pitch of the threads is approximately 0.125 inches, or approximately eight threads per inch.

In one embodiment, the metallic bottle has a body with a diameter of between approximately 2.537 inches and approximately 2.838 inches. In a more preferred embodiment, the body of the metallic has a diameter of between approximately 2.68 inches and approximately 2.695 inches. In one embodiment, the metallic bottle has a height of between approximately 6.0 inches and approximately 7.4 inches. In another embodiment, the metallic bottle has and a height of between approximately 6.175 inches and approximately 6.325 inches. In a preferred embodiment, the metallic bottle has and a height of between approximately 6.2 inches and approximately 6.3 inches. In still another embodiment, the metallic bottle has and a height of between approximately 7.112 inches and approximately 7.263 inches. In a preferred embodiment, the metallic bottle has and a height of between approximately 7.162 inches and approximately 7.213 inches.

As provided in the tables, claims, and detailed description below, various compositions of aluminum alloys are provided and contemplated herein. For each alloy, the amount of each component, i.e., Si, Fe, Cu, etc. may be varied approximately 15% to achieve satisfactory results. In one embodiment, at least one of Si, Fe, and Cu is added to the aluminum alloy. In another embodiment, only one of Si, Fe, and Cu is added to the aluminum alloy. In still another embodiment, no Si, Fe, or Cu is added to the aluminum alloy. In yet another embodiment, other elements may be added to the aluminum alloy. In one embodiment, one or more of Mn, Zn, Cr, and Ti are added to the alloy aluminum. In still another embodiment, only one of Mn, Zn, Cr, and Ti are added to the aluminum alloy. Furthermore, as appreciated by one skilled in the art, it is not necessary that the novel alloy compositions described herein and used in the impact extrusion process be comprised entirely or in part with recycled components and alloys. Rather, the alloys may be obtained and blended from stock materials which have not previously been used or implemented in previous products or processes.

In various embodiments of the present invention, lightweight containers with threaded necks comprising recycled contents are provided. At least one of the following advantages may be realized: strength to weight ratio; burst pressures; deformation pressures; dent resistance; resistance to scratching or galling; and/or reduction in weight and metal content. Other advantages are also contemplated. Furthermore, aspects and features of the present invention provide for containers with increased resistance to back annealing allowing liner materials with higher cure temperatures. In various embodiments, an alloy for producing IE containers with higher back annealing resistance is contemplated, resulting in improved container performance, and utilizing coatings requiring higher curing temperatures. Container designs and tooling designs for producing such containers are also contemplated.

In various embodiments of the present invention, an aluminum slug and corresponding IE container with sufficient strength characteristics to thread the neck and comprising recycled material is provided. The recycled content may be post-industrial or post-consumer content, the use of which enhances overall product and process efficiency. A significant portion of known scrap, such as offal from cup making processes, contains a higher concentration of alloying elements than the base 1070 alloy currently used. These alloying elements, while providing various cost and environmental advantages, modify the metallurgical characteristics of the aluminum. For example, inclusion of these elements increases the solidification temperature range. Casting challenges are thus present. As yield strength increases and the ductility decreases, issues are created with respect to rolling the strip, for example. Recrystallization characteristics are known to change, necessitating potential changes to the thermomechanical treatment(s), including but not limited to: rolling temperatures, rolling reductions, annealing temperatures, annealing process, and/or annealing times. The increased ultimate tensile strength and yield strength increases the tonnage loads when punching slugs.

Additionally, surface roughness and lubrication of the slugs of the present invention is critical due to the modified metallurgical characteristics. Tonnage loads on the extrusion presses are typically higher in connection with slugs of the present invention. In various embodiments, the increased material strength of the present invention enables attainment of standard container performance specifications at significant lower container weights and/or wall thicknesses.

In another aspect of the present invention, specific tools such as neckers, threading tools, cutters, and other devices are contemplated for use with the novel alloys and which are used in conjunction with the impact extrusion process and to form threads on IE containers. Further novel manufacturing techniques associated with using the novel alloy compositions are also contemplated with the present invention.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

Although generally referred to herein as "containers," "metal containers," "metallic bottles," "aluminum bottles," and/or "bottles," it should be appreciated that the processes and alloy compositions of the current invention may be used to form any variety of containers or other articles of manufacture of any size or shape. Accordingly, the term "metallic bottle" is intended to cover containers of any type.

Further, references made herein to "caps," "closures," "threaded closures," "Roll on Pilfer Proof Closures," and "ROPP closures" should not necessarily be construed as limiting the present invention to a particular type of closure or a particular thread design. It should be appreciated that the current process may be used to form a metal container with threads suitable for any variety of closures including ROPP closures, crown caps, and twist off caps of any size, thread design, or thread geometry. The current invention may also be used to form a metal container with interior threads designed to be sealed with a closure having threads formed on an exterior surface of the closure wherein the closure is inserted into an opening of the metal container. In addition, closures may be formed of any suitable material know in the art including metal, plastic, rubber, wood, cork, glass, or any combination thereof.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the summary of the invention given above and the detailed description of the drawings given below, serve to explain the principles of these embodiments. Those of skill in the art will recognize that the following description is merely illustrative of the principles of the invention, which may be applied in various ways to provide many different alternative embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

FIG. 5A is a fragmented front elevation view of a threaded neck of a metallic bottle of one embodiment of the present invention;

FIG. 7 illustrates a method and the associated tools used to form threads on a ROPP closure according to one embodiment of the present invention;

FIG. 8 are front elevation views of sealed metallic bottles according to various embodiments of the present invention;

Figure 1:
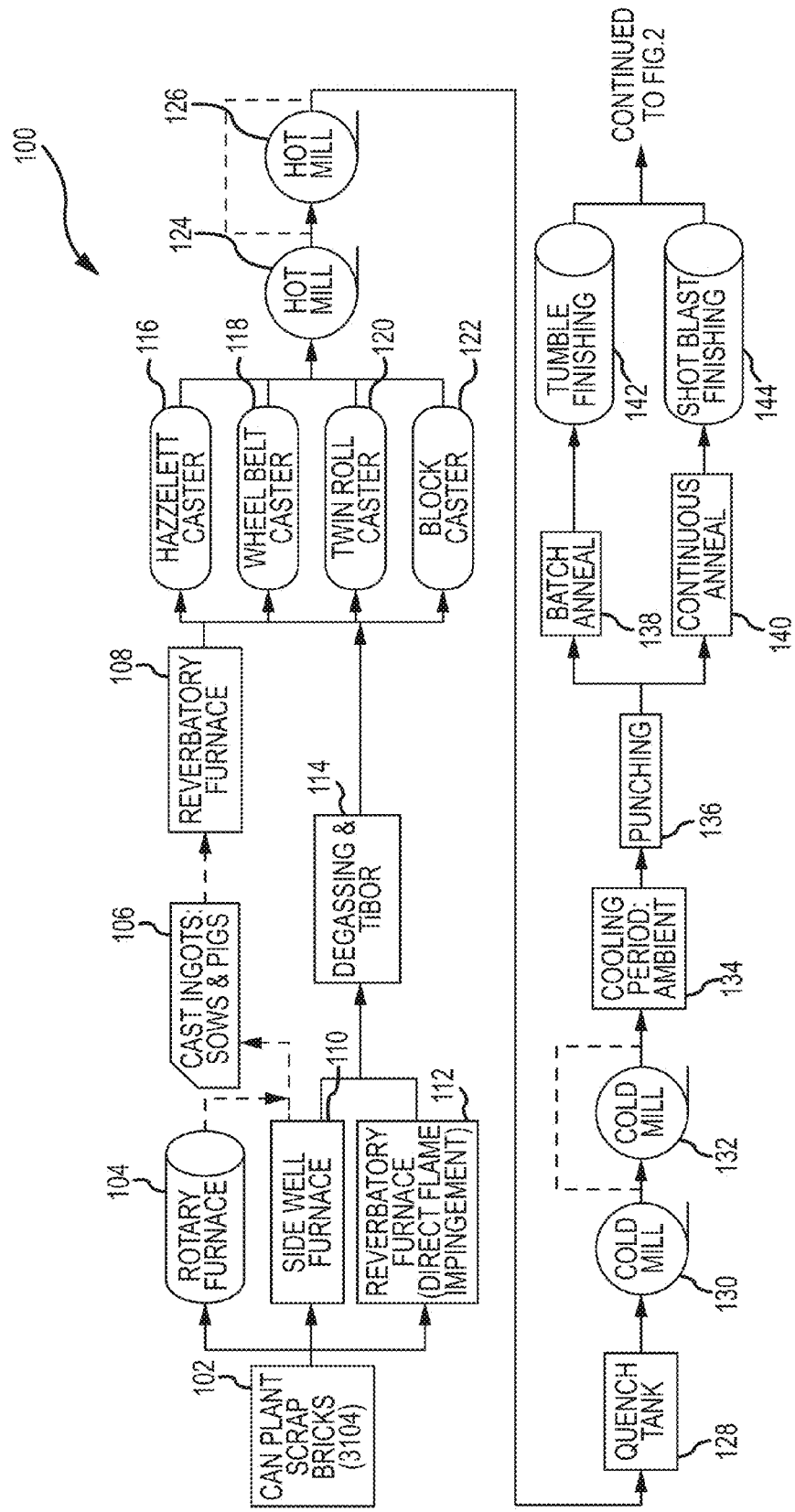
FIG. 1 illustrates a method for manufacturing an alloy slug from a recycled aluminum material.

A component list of the various components shown in drawings is provided herein:

| Number | Component |
| --- | --- |
| 100 | Method of fabricating an alloy |
| 102 | Scrap aluminum bricks |
| 104 | Rotary furnace |
| 106 | Cast ingots, sows, or pigs |
| 108 | Reverbatory furnace |
| 110 | Side well furnace |
| 112 | Reverbatory furnace |
| 114 | Titanium boride |
| 116 | Hazelett caster |
| 118 | Wheel belt caster |
| 120 | Twin roll caster |
| 122 | Block caster |
| 124 | Hot mill |
| 126 | Hot mill |
| 128 | Quench tank |
| 130 | Cold mill |
| 132 | Cold mill |
| 134 | Cooling |
| 136 | Punching |
| 138 | Batch anneal |

| Number | Component |
| --- | --- |
| 140 | Continuous anneal |
| 142 | Tumble finishing |
| 144 | Shot blast finishing |
| 200 | Method of manufacturing a metallic container |
| 202 | Slug lubrication |
| 204 | Impact extrusion |
| 206 | Wall ironing |
| 208 | Dome forming |
| 210 | Brushing |
| 212 | Washing |
| 214A | Interior coating |
| 214B | Curing |
| 216A | Base coating |
| 216B | Curing |
| 218A | Decoration |
| 218B | Cure |
| 220A | Over varnish |
| 220B | Cure |
| 222 | Dome forming |
| 224 | Necking |
| 226 | Shaping |
| 228 | Embossing |
| 230 | Trimming |
| 232 | Curl |
| 234 | Mouth mill |
| 235 | Thread forming |
| 236 | Inspection |
| 238 | Bundle |
| 240 | Palletize |
| 242 | Filling |
| 244 | Sealing |
| 250 | Metallic bottle |
| 252 | Body portion |
| 254 | Bottom dome portion |
| 256 | Sidewall portion |
| 258 | Neck portion |
| 260 | Opening |
| 261 | Interior surface of neck |
| 262 | Bottle outer diameter |
| 263 | Bottle height |
| 264 | Threads |
| 266 | Thread portion |
| 268 | Thread forming device |
| 270 | Inner core piece |
| 272 | Outer core piece |
| 274 | Thread forming surface |
| 276 | Thread forming surface |
| 278 | Chuck |
| 279 | Axial center |
| 280 | Helical ridges |
| 282 | Thread diameter |
| 284 | Thread pitch |
| 286 | Upper portion |
| 288 | ROPP closure |
| 290 | ROPP body portion |
| 291 | ROPP top portion |
| 292 | ROPP aperture |
| 294 | Pilfer band |
| 296 | Serrations |
| 298 | Pilfer band skirt |
| 302 | Capping apparatus |
| 304 | Pressing block |
| 306 | Thread roller |
| 308 | ROPP threads |
| 310 | Pilfer roller |
| 312 | Compressing block |
| 314 | ROPP liner |
| 316 | Curl |
| 318 | Knurls |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

As provided in the attached tables and text, various aluminum alloys are identified by numerical indications such as 1070 or 3104. As appreciated by one skilled in the art, aluminum is designated by its major corresponding alloying elements, typically in four-digit arrangement. The first of these four numbers corresponds to a group of aluminum alloys sharing a major alloying element, such as 2XXX (or copper, 3XXX for manganese, 4XXX (for silicon, etc. Thus, any references to the various aluminum alloys are consistent with the designations used throughout the aluminum and container manufacturing industry.

Referring now to the following tables and figures, a novel recycled aluminum alloy is provided for use in a metallic slug used in an impact extrusion process to manufacture shaped metallic bottles of sufficient strength characteristics to thread the neck portion. It should be understood, of course, that the invention is not limited to the particular embodiments illustrated in the drawings.

Methods, apparatus, and alloy compositions used in the manufacturing of slugs used to make containers and other articles from impact extrusion are disclosed in U.S. Provisional Patent Application Ser. No. 61/535,807 and to U.S. patent application Ser. No. 13/617,119 which are incorporated herein in their entirety by reference.

In many of the charts and examples provided below, the term "recycled aluminum alloy" (which may be abbreviate "RA") followed by a number may be used to identify a particular alloy of the present invention. Thus, the term "recycled aluminum alloy" or "RE" is merely an identifier for a metal containing recycled aluminum. In some instances, 3104 aluminum alloy commonly known in the art is recycled with another material, typically 1070 aluminum alloy. The number and percentage used after the term "recycled aluminum" identifies the percent of that 3104 recycled alloy which is combined with a 1070 aluminum alloy to form the new alloy used in an impact extrusion process. For example, recycled aluminum alloy 3104 30% or RA 3104-30 identifies that 30% of a 3104 alloy has been combined with 70% of a relatively pure 1070 aluminum alloy to form a new alloy having the metallurgical composition of Si, Fe, Cu, etc. provided in the charts. Other charts refer to the number "3105" and a percentage of that alloy provided in a given alloy, such as 20% or 40%. Similar to the 3104 alloy, the term "3105" is an aluminum alloy well known by those skilled in the art, and the 20% or 40% reflects the amount of that alloy which is mixed with a relatively pure 1070 aluminum alloy to form the new alloy which is used in the metal slug and the impact extrusion process to manufacture a container such as an aerosol can. Although not provided in the chart below, it is also feasible to use 3004 scrap material or non scrap 3004 aluminum ingots in the process to create new alloys. Table 1 below identifies one example of the various compositions of the alloys discussed herein. All values listed in the table are approximate values.

TABLE 1

| Element | AA3104 | AA3004 | AA3105 | AA1070 |
|---|---|---|---|---|
| Si | 0.3 | 0.3 | 0.6 | 0.05 |
| Fe | 0.5 | 0.6 | 0.7 | 0.18 |
| Cu | 0.2 | 0.3 | 0.3 | 0.01 |
| Mn | 1.0 | 0.3 | 0.3 | 0.01 |
| Mg | 1.2 | 0.4 | 0.2 | 0.01 |
| Zn | 0.1 | 0.2 | 0.4 | 0.01 |
| Cr | 0.03 | 0.1 | 0.2 | 0.01 |
| Ti | 0.01 | 0.01 | 0.01 | 0.01 |
| Al | 96.7 | 97.8 | 97.3 | 99.7 |

Table 2 illustrates compositions of recycled slug materials, wherein the pure aluminum is aluminum alloy 1070 and the recycled scrap material is 3104 at different percentages. All values listed in the table are approximate values.

TABLE 2

| Element | 3104 20% | 3104 30% | 3104 30% | 3104 50% | 3104 60% |
|---|---|---|---|---|---|
| Si | 0.1 | 0.13 | 0.15 | 0.18 | 0.2 |
| Fe | 0.25 | 0.28 | 0.31 | 0.34 | 0.38 |
| Cu | 0.05 | 0.07 | 0.09 | 0.11 | 0.13 |
| Mn | 0.21 | 0.31 | 0.41 | 0.51 | 0.61 |
| Mg | 0.25 | 0.37 | 0.49 | 0.61 | 0.73 |
| Zn | 0.03 | 0.04 | 0.05 | 0.06 | 0.07 |
| Cr | 0.02 | 0.02 | 0.02 | 0.02 | 0.03 |
| Ti | 0.01 | 0.01 | 0.01 | 0.01 | 0.01 |
| Al | 98.08 | 98.77 | 98.47 | 98.16 | 97.84 |

Table 3 illustrates compositions of recycled slug materials, wherein the pure aluminum is aluminum alloy 1070 and the recycled scrap material is alloy 3105 at different percentages. All values listed in the table are approximate values.

TABLE 3

| Element | 3105 20% | 3105 30% | 3105 40% | 3105 50% | 3105 60% |
|---|---|---|---|---|---|
| Si | 0.16 | 0.22 | 0.27 | 0.33 | 0.38 |
| Fe | 0.29 | 0.34 | 0.39 | 0.44 | 0.5 |
| Cu | 0.07 | 0.10 | 0.13 | 0.16 | 0.19 |
| Mn | 0.07 | 0.10 | 0.13 | 0.16 | 0.19 |
| Mg | 0.05 | 0.07 | 0.09 | 0.11 | 0.13 |
| Zn | 0.09 | 0.13 | 0.17 | 0.21 | 0.25 |

TABLE 3-continued

| Element | 3105 20% | 3105 30% | 3105 40% | 3105 50% | 3105 60% |
|---|---|---|---|---|---|
| Cr | 0.05 | 0.07 | 0.09 | 0.11 | 0.13 |
| Ti | 0.01 | 0.01 | 0.01 | 0.01 | 0.01 |
| Al | 99.21 | 98.96 | 98.72 | 98.47 | 98.22 |

Table 4 illustrates compositions of recycled slug materials, wherein the pure aluminum is aluminum alloy 1070 and the recycled scrap material is alloy 3004 at different percentages. All values listed in the table are approximate values.

TABLE 4

| Element | 3004 20% | 3004 30% | 3004 40% | 3004 50% | 3004 60% |
|---|---|---|---|---|---|
| Si | 0.10 | 0.13 | 0.15 | 0.18 | 0.2 |
| Fe | 0.27 | 0.31 | 0.35 | 0.39 | 0.44 |
| Cu | 0.07 | 0.10 | 0.13 | 0.16 | 0.19 |
| Mn | 0.07 | 0.10 | 0.13 | 0.16 | 0.19 |
| Mg | 0.09 | 0.13 | 0.17 | 0.21 | 0.25 |
| Zn | 0.05 | 0.07 | 0.09 | 0.11 | 0.13 |
| Cr | 0.03 | 0.04 | 0.05 | 0.06 | 0.07 |
| Ti | 0.01 | 0.01 | 0.01 | 0.01 | 0.01 |
| Al | 99.31 | 99.11 | 98.92 | 98.72 | 98.52 |

Table 5 illustrates compositions of recycled slug materials, wherein aluminum alloy 1070 is combined with a recycled aluminum material with the composition indicated. The recycled aluminum material represents an alloy formed from various scrap aluminum material. All values listed in the table are approximate values.

TABLE 5

| Element | Recycled aluminum | Tolerance +/− | RA 60% | | | RA 80% | | |
|---|---|---|---|---|---|---|---|---|
| | | | Min | Target | Max | Min | Target | Max |
| Si | 0.26 | 0.02 | 0.16 | 0.18 | 0.20 | 0.20 | 0.22 | 0.24 |
| Fe | 0.53 | 0.02 | 0.37 | 0.39 | 0.41 | 0.44 | 0.46 | 0.48 |
| Cu | 0.16 | 0.02 | 0.08 | 0.10 | 0.12 | 0.11 | 0.13 | 0.15 |
| Mn | 0.84 | 0.03 | 0.48 | 0.51 | 0.54 | 0.65 | 0.68 | 0.71 |
| Mg | 0.6 | 0.03 | 0.34 | 0.37 | 0.40 | 0.46 | 0.49 | 0.52 |
| Zn | 0.12 | 0.02 | 0.06 | 0.08 | 0.10 | 0.08 | 0.10 | 0.12 |
| Cr | 0.02 | 0.02 | 0.01 | 0.02 | 0.04 | 0.01 | 0.02 | 0.04 |
| Ti | 0.02 | 0.02 | 0.00 | 0.02 | 0.04 | 0.00 | 0.02 | 0.04 |
| Al | | | 98.15 | 98.33 | 98.50 | 97.70 | 97.88 | 98.05 |

FIG. 1 illustrates a method 100 of fabricating an alloy from recycled aluminum. While a general order of method 100 is illustrated in FIG. 1, the method 100 can include more or fewer steps and the order of the steps can be arranged differently than the method 100 illustrated in FIG. 1. The recycled aluminum is processed to make slugs, which may be used in an impact extrusion process. Following the formation of the slugs, the slugs are processed in order to manufacture a metallic bottle as provided in FIG. 2, which is discussed in greater detail below.

One aspect of the present invention is a method to fabricate a recycled aluminum material. The recycled aluminum slug material may comprise a recycled scrap aluminum and a pure aluminum, which are melted and cast together to form a novel recycled aluminum slug. Suitable recycled aluminum material may include many 3XXX alloys, especially 3005, 3104, 3105, 3103, 3013, and 3003 alloys. In smaller quantities, other alloys may be used to achieve the target chemistry. Alloy 3104 scrap is commonly sourced from beverage can plants. Alloy 3005 is commonly sourced from the automotive industry. The pure aluminum may include aluminum alloys 1070 or 1050. A variety of scrap aluminum sources may be used as a source for the alloying element of the recycled aluminum alloy of the present invention. Pure aluminum alloys such as 1050 or 1070 may be used with elemental additions to achieve the target chemical composition of the recycled aluminum alloy.

Melting

Scraps bricks comprising recycled scrap aluminum are melted to facilitate mixing with the molten pure aluminum 102. The recycled scrap aluminum may comprise aluminum alloys 3005, 3104, 3105, 3003, 3013, or 3103. When the furnace flame directly contacts the recycled aluminum, a small amount of the surface aluminum oxidizes. If the surface area is large, such as compacted scrap bricks, the amount of the material oxidized and the melt loss is higher than if the scrap bricks comprise a small surface area. Therefore, melting furnaces that utilize indirect methods to heat the materials are preferred to those that utilize direct flame impingement.

More specifically, melting may occur in several types of furnaces. For example, a reverbatory furnace 112 may be used which is typical to produce conventional impact extrusion slugs. The aluminum is subject to direct flame impingement. When melting compacted bricks of thin aluminum, the melt loss may likely be high. Therefore, a reverbatory furnace 112 is not a preferred method to produce recycled aluminum alloy slugs because of the high melt loss.

In general, a furnace that utilizes an indirect method to heat the materials is preferred. Furnaces that utilize an indirect method to heat materials include, but are not limited to, side well furnaces 110 and rotary furnaces 104. Thus, a side well furnace 110 may be used as the furnace. Side well furnaces contain the aluminum and gas burners transfer heat to the molten metal. The molten metal is then used to melt the scrap. Side well furnaces also have an impeller that circulates the molten bath through a side well. Scrap aluminum is fed into the side well at a rate such that the material largely melts before it circulates into the portion of the side well furnace where direct flame impingement is possible. The use of a side well furnace 110 is a preferred method for melting scrap metal for the recycled aluminum alloy production.

Alternatively, a rotary furnace 104 may be used. A rotary furnace 104 is similar to a concrete mixer. The aluminum scrap tumbles in one corner of the rotating cylinder. The flame is directed away from this area and heats the refractory lining. The hot lining rotates and contacts the aluminum and transfers energy to the aluminum. A rotary furnace 104 is a preferred method for melting scrap for the production of the recycled aluminum alloy. If a rotary furnace 104 or side well furnace 110 is used, the scrap exiting the rotary furnace 104 or side well furnace 110 may be melted and cast into ingots, sows or pigs 106 in an operation separated from the slug production. These ingots, sows or pigs may be melted in a second reverbatory furnace 108 with minimal melt loss because the surface area is relatively small. If elevated melt loss does occur during the melting process, dross must be removed from the bath.

In one embodiment, Titanium boride (TiBor) 114 is added to the melted blend of aluminum alloys just prior to the caster normally by a continuous feed of aluminum with a titanium boride dispersion. Alternatively, the TiBor could possibly be added to the aluminum scrap alloy while it is in the furnace. The TiBor may refine the grain structure of the recycled aluminum alloy during processing. The TiBor concentration is between about 1 lb/ton to about 2.6 lb/ton. In some embodiments, the TiBor concentration is about 0.6 kg/metric tonne.

Casting

Following the melting process, the molten alloy is cast. In the casting process, molten alloy is solidified into a continuous slab of any suitable dimension using one of several casting techniques. In some embodiments of the present invention, the cast slabs are about 8 inches to about 14 inches in width and about 0.75 inches to about 1.5 inches thick. The casting speed should be in the range of between about 0.55 to about 0.88 tons/hour/inch of width. In some embodiments, the casting speed may be about 0.68 tons/hour/inch of width.

Different casting methods may be used and may be chosen from a Hazelett caster 116, a wheel belt caster 118, a twin roll caster 120 and/or a block caster 122. When a wheel belt caster 118 is used, the molten aluminum is held between a flanged wheel and a thick metal belt during solidification. The belt wraps around the wheel at about 180°. Both the wheel and the belt are chilled with water on the back side to optimize and control heat extraction. This wheel belt caster process is commonly used to make 1070 and 1050 slugs. However, the thick steel belt is inflexible and unable to deflect and maintain contact with the slab that is shrinking due to solidification. The effect is magnified by the recycled aluminum alloys because it solidifies over a larger temperature range than the more pure alloys, 1050 and 1070.

Alternatively, a Hazelett caster 116 may be used. When a Hazelett caster 116 is used, the molten aluminum is held between two parallel, flexible steel belts during solidification. Steel dam blocks are chain mounted and form the sides of the mold. The parallel belts slope slightly downward to allow gravity to feed molten aluminum into the system. High pressure water is sprayed on the back side of both belts to optimize and control heat extraction. This high pressure water also deflects the belt to keep it in contact with the solidifying, contracting slab. This belt deflection enables the Hazelett caster 116 to produce a wide range of aluminum (and other) alloys. The Hazelett caster process is commonly used to produce architectural aluminum strip and may be used to produce impact extrusion slugs.

Alternatively, a twin roll caster 120 may be used. When a twin roll caster 120 is used, the molten aluminum is held between two counter rotating, water cooled rolls during solidification. The process provides a very small solidification zone and is therefore limited to relatively thin "slabs." At this thickness, the term strip is probably more accurate than slab. This process is commonly used in the manufacture of aluminum foil.

Alternatively, a block caster 122 may be used. When a block caster 122 is used, the molten aluminum is held between a series of chain mounted steel blocks during solidification that form the sides of the mold. The blocks are water cooled to optimize and control heat extraction.

A lubricating powder may be applied to the caster components that contact the slab. More specifically, a graphite or silica powder may be applied as necessary. Temperature control is important during and following the casting process. During casting, regardless of the casting process used, the cooling rate and temperature profile of the slab must be carefully controlled during solidification. The wheel belt caster 118 reduces the cooling water flow rate to achieve this. If the Hazelett caster 116 is used, the water flow for general control and gas flow over the slab may be used to closely modify the temperature. Ambient conditions, especially air flow must be controlled near the caster. This air flow control is especially critical when gas flow is used to modify the slab temperature.

The temperature of the slab at the exit of the caster must also be carefully controlled. The exit temperature of the slab through the caster must be above about 968° F., however the maximum temperature of any part of the slab exiting the caster must be less than about 1080° F.

Rolling

Following casting, the thickness of the slab is reduced from about 1.10-1.38 inches to a specified thickness of between about 0.118 inches to about 0.551 inches with a hot mill 124/126 and a cold mill 130/132. The relative thickness reduction taken in the hot mill 124/126 and the cold mill 130/132 significantly affects the metallurgical grain structure of the finished product. The thickness of the slab at the hot mill exit may vary. In some embodiments, the thickness of the slab following hot milling 124/126 is between about 0.236 inches to about 0.709 inches. In order to reach the specified thickness, the slab passes between two counter rotating rolls with a gap less than the incoming thickness while the slab is still at a high temperature of between about 842° F. to about 1,022° F. Rolling mills have two commonly used configurations. The most common is a two-high mill that contains only two counter-rotating rolls that contact the slab/strip. Two rolling mills are used to obtain the desired thickness. However, a different number of rolling mills may be used: 1, 3, etc. Optionally, an advanced design is a four-high mill in which the two-counter rotating rolls, the work rolls, are backed up by larger rolls. Optionally, an additional hot mill 126 may be used. Alternatively, multiple hot mills may be used and the slabs may be recirculated to a hot mill 124/126 in order to achieve the specified thickness.

During hot rolling 124/126, the alloy material may dynamically recrystallize and/or recover. This recrystallization and/or recovery is a self annealing process enabled by the heat in the slab/strip. The temperatures at which dynamic recrystallization and/or recovery may occur varies with alloy content and may therefore differ for 1050/1070 and recycled aluminum alloys. In most instances, the temperature for dynamic recrystallization and/or recovery is between about 662° F. to about 1,022° F. for recycled aluminum alloy material.

Following hot mill 124/126, the hot rolled strip is immersed in a quench tank 128. The quench tank 128 contains water that reduces the strip temperature to near ambient. Following quenching, the strip is subjected to a cold mill 130/132. The strip may be at ambient temperature and passes between two counter rotating rolls with a gap less than the incoming thickness. Normally two rolling mills may be used to obtain the desired thickness. However, a different number of rolling mills may be used: 1, 3, etc. At ambient temperature, the cold rolled strip does not recrystallize. This cold working causes the yield strength of the material to increase and the ductility decreases. Cold mills 130/132 may have two-high and four-high configurations. The four-high configuration may have better thickness control and is therefore strongly preferred during cold rolling when the final thickness is made. Optionally, an additional cold mill 132 may be used. Alternatively, multiple cold mills may be used and the slabs may be recirculated to a cold mill 130/132 in order to achieve the specified thickness.

The relative amounts of thickness reduction taken during the hot mill 124/126 and cold mill 130/132 have a large effect on the recovery and recrystallization kinetics during annealing. The optimal ratio varies with alloy content, rolling mill capability and final strip thickness.

The internal friction in the strip causes the temperature to rise during cold milling 130/132 making the strip warm. Therefore, strips may be subjected to ambient cooling 134 at between about 59° F. to about 122° F., preferably about 77° F., for between about 4 hours to about 8 hours following cold milling 130/132. Alternatively, the cooled strip is typically held in storage to allow it to return to ambient temperature.

The cooled strips are punched 136. The cooled strip is uncoiled and fed into a die set mounted in a press. The die set cuts circular slugs from the strip, though it is understood that any shape of slug such as triangle, oval, circle, square, diamond, rectangle, pentagon, or the like may be used depending upon the shape of the die and/or the desired end product. The punching tool may be modified in order to control burrs. By way of example, the tool may be modified so that the die button chamfer is between about 0.039 inches by about 25° to about 0.050 inches by 29°.

Annealing

Optionally, the punched slugs are heated to recrystallize the grains and ideally form a homogeneous, equiaxed grain structure. The process decreases the strength of the material and increases ductility. Annealing may occur by batch annealing 138 and/or continuous annealing 140.

When the punched slugs are batch annealed 138, the punched slugs may be loosely loaded into a holding device such as a wire mesh baskets. Several holding devices may be stacked together inside a furnace. The door to the furnace is closed and the slugs may be heated to a target temperature and held for a specified time. The target temperature within the interior of furnace is preferably between about 878° F. to about 1,112° F. for between about 5 to about 9 hours, though the annealing time and temperature have a strong interaction and are influenced by the alloy content of the slugs. The furnace may be turned off and the slugs allowed to slowly cool in the furnace. Because of the large mass of punched slugs in the furnace, there may be considerable inconsistency in the temperature of the slugs. The packed slugs on the outside of the pack reach a higher temperature faster. The central slugs heat more slowly and never reach the maximum temperature achieved by the peripheral slugs. Furthermore, air cooling the slugs may allow for the formation of oxides. In order to prevent or decrease the formation of oxides, an inert gas may be circulated in the furnace while the furnace is at temperature and/or while it is cooled. Alternatively, the batch annealing 138 may occur in an inert atmosphere or under vacuum.

Figure 3:
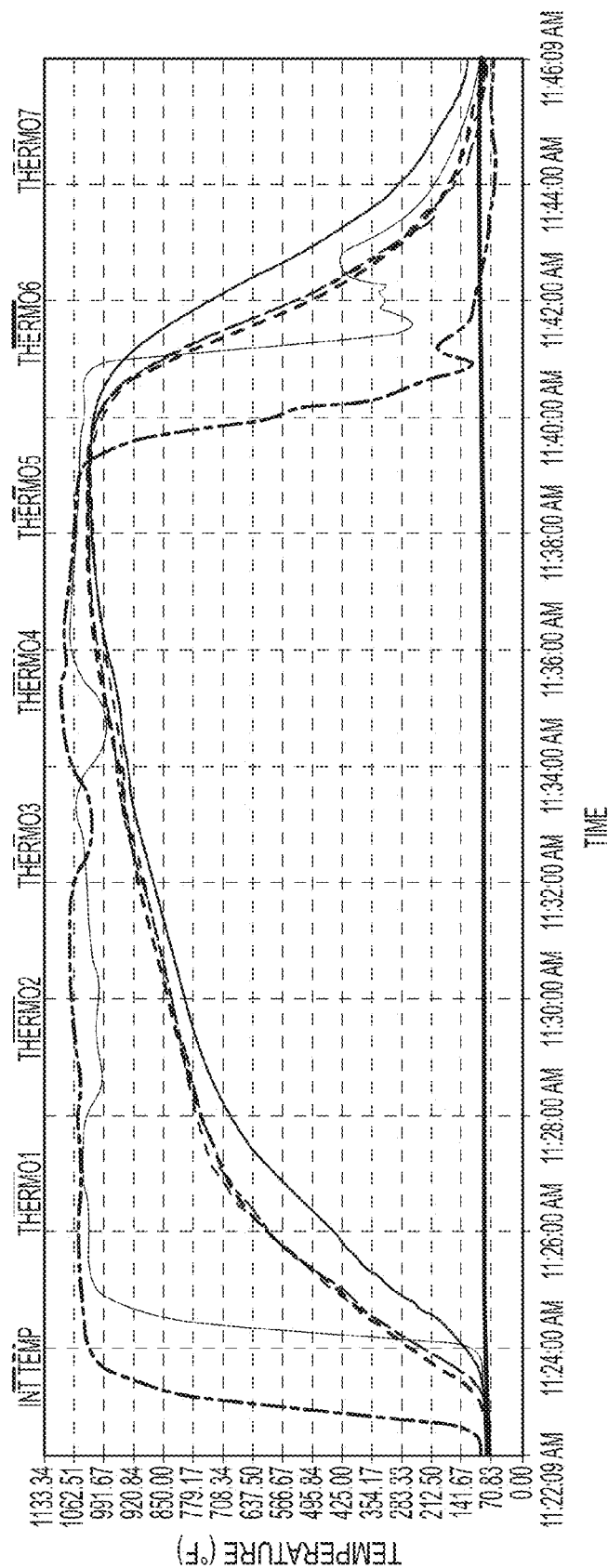
FIG. 3 illustrates a continuous anneal process.

Alternatively, the punched slugs may be continuously annealed 140. When the punched slugs are continuously annealed 140, the slugs are loosely distributed on a metal mesh belt on conveyed through a multi-zone furnace. The punched slugs are quickly heated to a peak metal temperature and then quickly cooled. The operation may be performed in air. The peak metal temperature of the punched slugs is between about 842° F. to about 1058° F. The peak metal temperature influences the final metallurgical characteristics. The peak temperature for optimal metallurgical characteristics is influenced by alloy content. Continuous annealing 140 is the preferred process for producing recycled aluminum alloy slugs. Continuous annealing 140 provides two benefits over batch annealing. First, the shorter time at elevated temperature reduces oxide formation on the surface of the slug. Aluminum oxides are a concern, however, magnesium oxides are a major concern due to its extreme abrasive nature. Increased magnesium oxide on the surface of the punched slugs may cause excessive scratching of tools used during the impact extrusion process. On extended runs these scratches are an unacceptable quality defect. Second, the precisely controlled and homogeneous thermal cycle including rapid heating, limited time at elevated temperature, and rapid cooling of the continuous anneal 140 results in improved and more uniform metallurgical grain structure. This in turn produces IE containers of higher strength. Higher strength containers enable the IE containers to be lighter. FIG. 3 illustrates temperature curves of a continuous annealing process.

Finishing

Optionally, the surface of the punched slugs may be finished by roughening the surface of the punched slugs. Different methods may be used to finish the punched slugs. In an embodiment, a tumbler process 142 may be used. A large quantity of the punched slugs are placed in a drum or other container and the drum is rotated and/or vibrated. As slugs fall onto other slugs, denting may occur to one or both slugs. The purpose of roughening the surface is to increase the high surface area of the punched slug and create recesses to hold lubricant. The large faces of the punched slugs may also be finished along with the sheared surfaces.

In another embodiment, a shot blast finishing process 144 may be used. In the shot blast finishing process 144, a large number of slugs are placed in an enclosed drum and subjected to impingement by aluminum shot or other materials. The shot forms small depression on the surfaces of the slugs. The slugs are tumbled slightly so the aluminum shot contacts all surfaces of the slug. Shot blasting 144 is the preferred process for producing recycled aluminum alloy slugs, and aggressive shot blasting has been shown to be the most effective at removing surface oxides from slugs. This removal of the surface oxides are especially critical for removing adherent magnesium oxides, which cause scratches in IE containers if they are not removed from the slug.

Slug Processing

Figure 2:
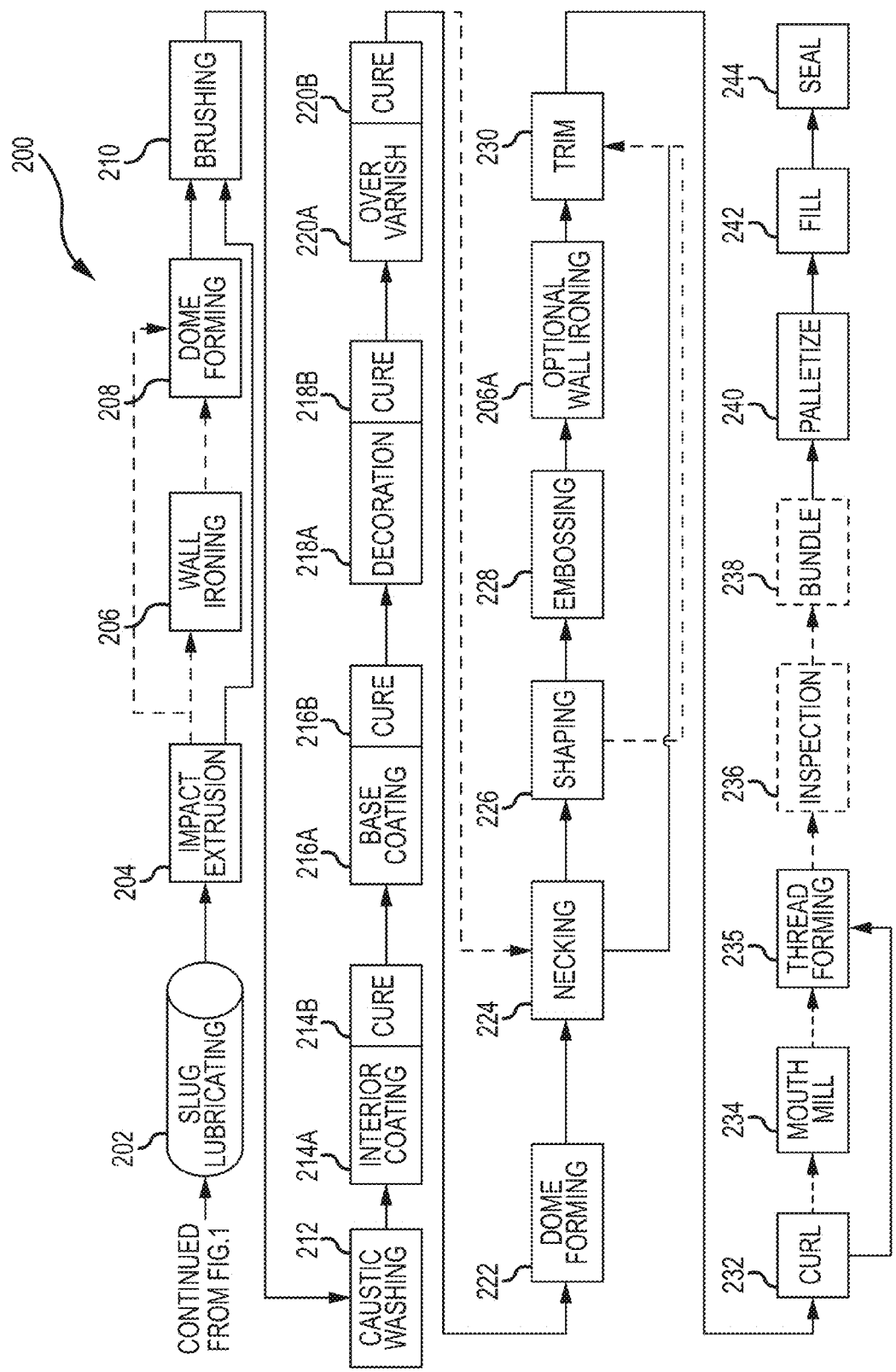
FIG. 2 illustrates an impact extrusion method for use with the recycled aluminum material, and is a continuation of the process shown in FIG. 1.
Figure 4A:
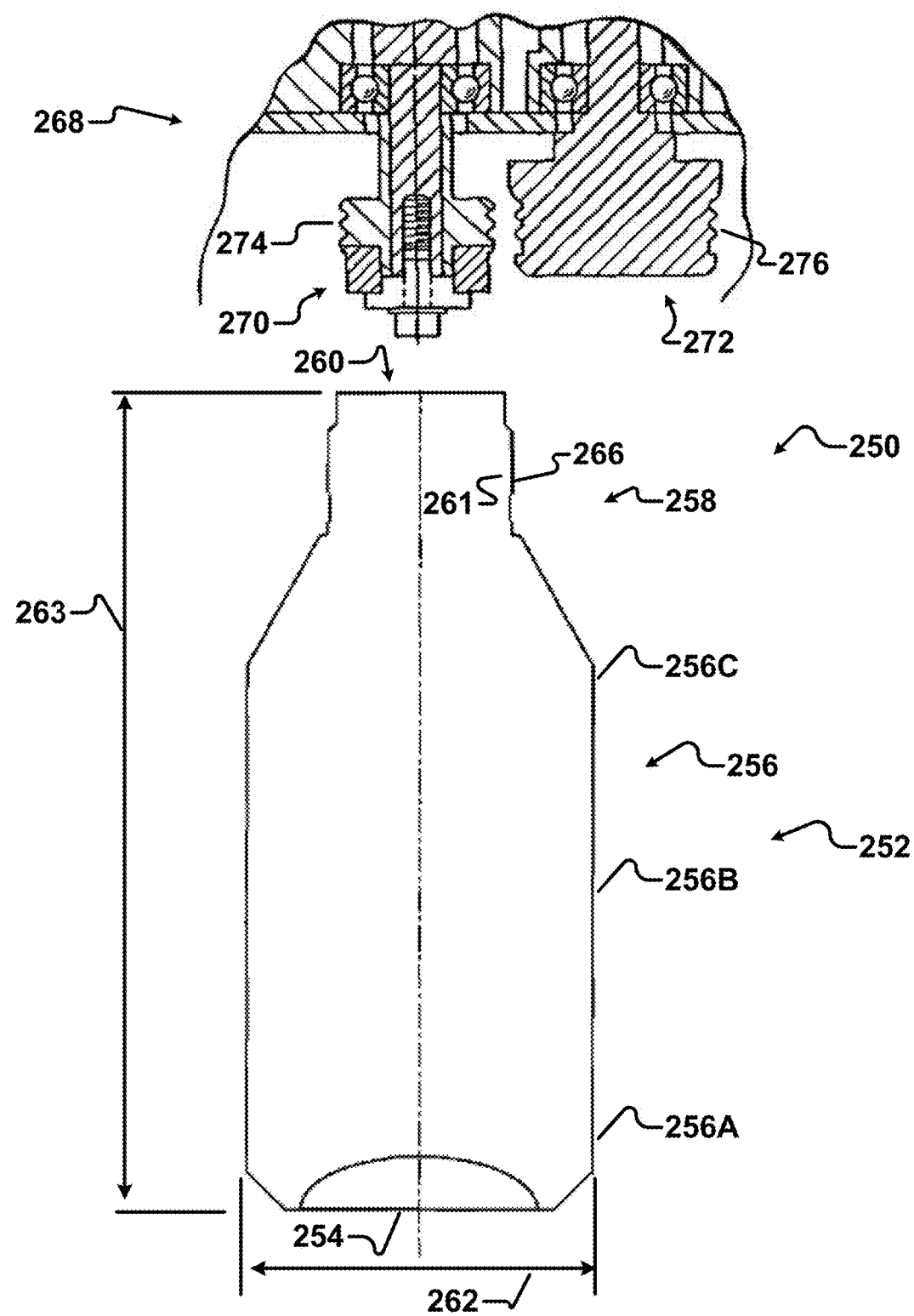
FIGS. 4A and 4B illustrate a method and the associated tools used to form threads on a metallic bottle according to one embodiment of the present invention.

FIG. 2 illustrates a method 200 of manufacturing a metallic bottle 250 using a slug manufactured from recycled scrap material according to the method 100 as illustrated in FIG. 1. While a general order of method 200 is illustrated in FIG. 2, the method 200 can include more or fewer steps and the order of the steps can be arranged differently than illustrated in FIG. 2. One embodiment of a metallic bottle 250 of the present invention is illustrated in FIG. 4A.

A slug lubrication process 202 may be used wherein the slugs are tumbled with a powdered lubricant. Any suitable lubricant may be used as appreciated by one skilled in the art. Typically about 3.53 oz of lubricant is used per about 220 lb of slugs. Tumbling the lubricant with the slugs forces lubricant onto the slugs. If the slugs have been roughened, then tumbling the slugs with the lubricants forces the lubricant into the depressions created during the finishing operation.

Following the slug lubrication process 202, the lubricated slugs are subjected to an impact extrusion process 204. More specifically, the lubricated slugs are placed in a cemented carbide die of precise shape. The lubricated slug is impacted by a steel punch, also of precise shape, and the aluminum is extruded backwards away from the die. The tooling shapes dictate the wall thickness of the extruded tube portion of the metallic bottle 250. Although this process is generally known as back extrusion, a forward extrusion process or combinations of back and forward extrusion could also be used as appreciated by one skilled in the art. In some embodiments of the present invention, the tooling of the punch and die have shapes to form threads in the extruded metallic bottle 250.

Optionally, wall ironing 206 may be performed. The metallic bottle 250 may be passed between a punch and an ironing die with negative clearance. In one embodiment, wall ironing 206 thins the wall of the tube. In another embodiment, wall ironing 206 is performed on the tube to increase the thickness of an area that will become the thread region 266 of the neck portion 258 of the metallic bottle 250 to between about 0.0125 inches and about 0.0155 inches. The thickness of the thread region 266 is greater than a thickness of the body portion 252 of the metallic bottle 250, resulting in a stronger thread region 266 without increasing the amount of used to form the rest of the metallic bottle 250 and thereby reducing the material cost of each metallic bottle produced. The higher strength of the recycled aluminum alloy increases die deflection. Therefore a smaller die is required to achieve the desired wall thickness. This optional process optimizes material distribution and keeps longer tubes straight.

Optionally, following the impact extrusion 204 or the wall ironing 206, the dome forming 208 on the bottom 254 of the metallic bottle 250 may be performed. The full dome or a portion of the dome may be formed either at the end of the ironing stroke or in the trimmer.

Next, the metallic bottle 250 is brushed 210 to remove surface imperfections. The rotating metallic bottle 250 is brushed by an oscillating metal or plastic, typically nylon, brush. Furthermore, brushing 210 may be performed if the metallic bottle 250 has been subjected to wall ironing 206 and/or doming 208.

Following brushing 210, the metallic bottle 250 is washed 212 in a caustic solution to remove lubricants and other debris. The caustic wash 212 may comprise sodium hydroxide or alternatively potassium hydroxide or other similar chemicals known by those skilled in the art.

Coatings

The interior of the metallic bottle 250 is typically lance coated 214A. In one embodiment, the coating may be epoxy based. The coating may be applied using any suitable method including, but not limited to, spraying, painting, brushing, dipping, or the like. The coating is thermally cured 214B at a temperature of between about 392° F. to about 482° F. for between about 5 to about 15 minutes.

Base coating 216A is generally applied to the exterior of the metallic bottle 250. The base coating may be a white or clear base coat. The coating may be applied using any suitable method including, but not limited to, spraying, painting, brushing, dipping, or the like. The coating is thermally cured 216B at a temperature of between about 230° F. to about 356° F. for between about 5 to about 15 minutes.

Decorative inks 218A may also be applied to the base coated metallic bottle 250 to produce brand names, logos, designs, product information, and/or other preferred indicia. The decorative ink may be applied using any suitable method including, but not limited to, spraying, painting, brushing, dipping, printing, or the like. Optionally, the metallic bottle 250 may be decorated using lithography or other printing processes such as offset printing, dry offset printing, gravure printing, intaglio printing, screen printing, tampo printing, and inkjet printing. Methods and apparatus used to decorate metallic containers are disclosed in U.S. Provisional Patent Application Ser. No. 61/833,799 which is incorporated herein in its entirety by reference. The decorative inks may be non-varnish inks or any other suitable ink, including thermochromatic inks. The decorative inks are thermally cured 218B at a temperature of between about 248° F. to about 356° F. for between about 5 to about 15 minutes.

A clear over varnish 220A is applied to the metallic bottle 250. The varnish may be applied using any suitable method including, but not limited to, spraying, painting, brushing, dipping, or the like. The varnish is thermally cured 220B at a temperature of between about 302° F. to about 392° F. for between about 5 to about 15 minutes. The coatings protect the metal of the body portion from tooling contact, corrosion, and/or to protect the contents of the metallic bottle. Optionally, one or more of the coatings may be cured 214B, 216B, 218B, 220B using any other suitable method known to those of skill in the art including using ultra violet light.

Dome Forming

Optionally, dome forming 222 may be formed or completed on the bottom of the metallic bottle 250. Dome forming 222 may be completed at this stage to ensure that the decoration extends to the standing surface of the metallic bottle 250. An advantage of a two stage doming operation (before trimming 230 and before necking 224) is that the base coat extends to the standing surface of the finished can.

Necking and Shaping

In a number of successive operations, the diameter of the opening 260 of the metallic bottle 250 may be reduced by a process called necking 224. Methods and apparatus used in necking metal containers are disclosed in U.S. Pat. Nos. 4,403,493, 4,693,108, 4,732,027, 5,138,858, 5,448,903, 5,469,729, 5,713,235, 5,778,723, and 7,140,223 which are each incorporated herein in their entirety by reference. The number of reducing steps depends on the diameter reduction of the metallic bottle 250 and the shape of the neck 258. For recycled aluminum alloy material, more necking steps are generally anticipated. Further, as the recycled aluminum alloy content is altered, some modifications may be expected. For example, one modification requires that the necking center guides be changed in some instances. Larger center guides must be installed when running lightweight recycled aluminum alloy metallic bottles 250 that are thinner near the top.

Optionally, the body 252 of the metallic bottle 250 may be shaped 226. Shaping 226 may occur in various stages. The number of shaping steps depends on the composition of the recycled aluminum alloy and the wall thickness of the metallic bottle 250. In one embodiment, the recycled aluminum alloy may require additional shaping stages as compared to a traditional IE process that uses conventional alloys. Similar to necking, a greater number of incremental forming steps must be used when shaping metallic bottles 250 made from recycled aluminum alloy of the present invention. In another embodiment, the number of shaping steps is similar to the number of shaping steps used to shape metallic bottles formed by a D&I process.

Embossing

Optionally, tooling may move perpendicular to the container axis and emboss 228 shapes in the metallic bottle 250. The force applied during embossing 228 may be higher when using recycled aluminum alloy material than when traditional impact extrusion material is used as a result of higher as formed strength relative to 1070 or 1050 alloys.

Wall Ironing

Optionally, wall ironing 206 may be performed. In one embodiment, the wall ironing 206 thins at least a portion of the wall of the tube. In another embodiment, the wall ironing 206 is performed on the tube, including the area that will become the thread region 266, to control the thickness of an area that will become the thread region 266 of the neck portion 258 of the metallic bottle 250 to between about 0.0125 inches and about 0.0155 inches. The thickness of the wall can be ironed to a final thickness that varies along the axis of the metallic bottle. The thickness of the thread region 266 is generally greater than a thickness of the body portion 252 of the metallic bottle 250, resulting in a stronger thread region 266 without increasing the amount of material used to form the rest of the metallic bottle 250 and thereby reducing the material cost of each metallic bottle produced.

Trimming and Curling

Metal flow in necking 224 may create an uneven, work hardened edge. Therefore, the edge is trimmed 230 prior to curling. Due to anisotropy differences, recycled aluminum alloy thickens in a different profile during necking 224. Therefore, it is possible at high necking reductions and high alloy content that additional trimming operations may be required.

In some embodiments, the open edge of the container is curled 232 over itself to create a mounting surface for an aerosol valve. For beverage bottles, the curl may accept a crown closure or may be formed into a thread to accept a cap or other closure. Optionally, a small amount of material may be machined off of the top of the curl, which is known as the mouth mill 234. The mouth mill 234 may be required for mounting certain aerosol valves.

Thread Forming

Referring now to FIG. 4A, threads are formed 235 on the neck portion 258 of the metallic bottle 250 in a number of successive operations. The metallic bottle 250 has a body portion 252 with a bottom dome portion 254. The body portion 252 also has a sidewall portion 256 with a lower sidewall portion 256A, a middle sidewall portion 256B, and an upper sidewall portion 256C. The body portion 252 has a neck portion 258 extending upwardly from the upper sidewall portion 256C. The neck portion 258 has a preformed thread portion 266 where the threads 264 will be formed. An opening 260 is positioned on an uppermost portion of the neck portion 258.

As may be appreciated by one of skill in the art, the metallic bottle 250 may have any size or shape. For example, in one embodiment, the sidewall portion 256 of the metallic bottle 250 generally has a cylindrical shape with an outer diameter 262 of approximately 1.77 inches. The body portion 252 has a thickness between about 0.0098 inches and about 0.0155 inches. In a more preferred embodiment, the body portion 252 has a thickness of between about 0.0135 inches and about 0.0145 inches. In one embodiment, the thickness of the neck region 258 is between about 0.0125 inches and about 0.0155 inches. In a more preferred embodiment, the thickness of the neck region 258 is between about 0.0135 inches and about 0.0145 inches. In one embodiment, the thread portion 266 has a material thickness greater than the thickness of a material thickness of the sidewall portion 256. In one embodiment, the metallic bottle has a diameter 262 of between approximately 2.6 inches and approximately 2.85 inches. In a more preferred embodiment, the diameter of the metallic bottle is between approximately 2.64 and approximately 2.75 inches. In a still more preferred embodiment, the diameter of the metallic bottle is approximately 2.6875 inches. In one embodiment, the metallic bottle 250 has a height 263 between about 6.2 inches and about 6.3 inches. In a preferred embodiment, the height of the metallic bottle is approximately 6.25 inches. In still another embodiment, the height of the metallic bottle is between about 7.1 inches and about 7.25 inches. In another preferred embodiment, the height 263 is about 7.1875 inches. In yet another embodiment, the height 263 of the metallic bottle is between approximately 6.0 inches and approximately 7.4 inches.

In another embodiment (not illustrated), the sidewall portion 256 of the metallic bottle 250 has a gradual and smooth taper from the starting cylindrical body diameter transitioning inward with a large convex radius (preferably from 2 to 20 inches) and smoothly blending into a similar size concave radius to the vertical chimney. This shaped sidewall portion 256 has a first outer diameter at the lower sidewall portion 256A substantially equal to an outer diameter at the upper sidewall portion 256C. The first outer diameter is greater than a second outer diameter near the middle sidewall portion 256B of the body portion 252. In yet another embodiment, the metallic bottle 250 has a tapered body portion 252 with a diameter 262 at the lower sidewall portion 256A which is greater than a diameter at the middle sidewall portion 256B and a diameter at the upper sidewall portion 256C.

In one embodiment, a thread forming device 268 forms the threads 264 in the metallic bottle 250. The device 268 has an inner core piece 270 that is moved into the opening 260 of the metallic bottle 250 and contacts an interior surface portion 261 of the thread portion 266 of the neck 258. An outer core piece 272 is positioned in contact with an exterior surface of the thread portion 266. The inner and outer pieces 270, 272 have thread forming surfaces 274, 276 with concave and convex portions predetermined to form the threads 264 on the metallic bottle 250. Inner and outer pieces 270, 272 with different surfaces 274, 276 may be interconnected to the thread forming device 268 to form threads with different shapes and geometries on metallic bottles 250. In one embodiment, two or more different inner and outer pieces 270, 272 with different surfaces 274, 276 may be used in a number of successive operations to form the threads on the metallic bottles 250.

Figure 4B:
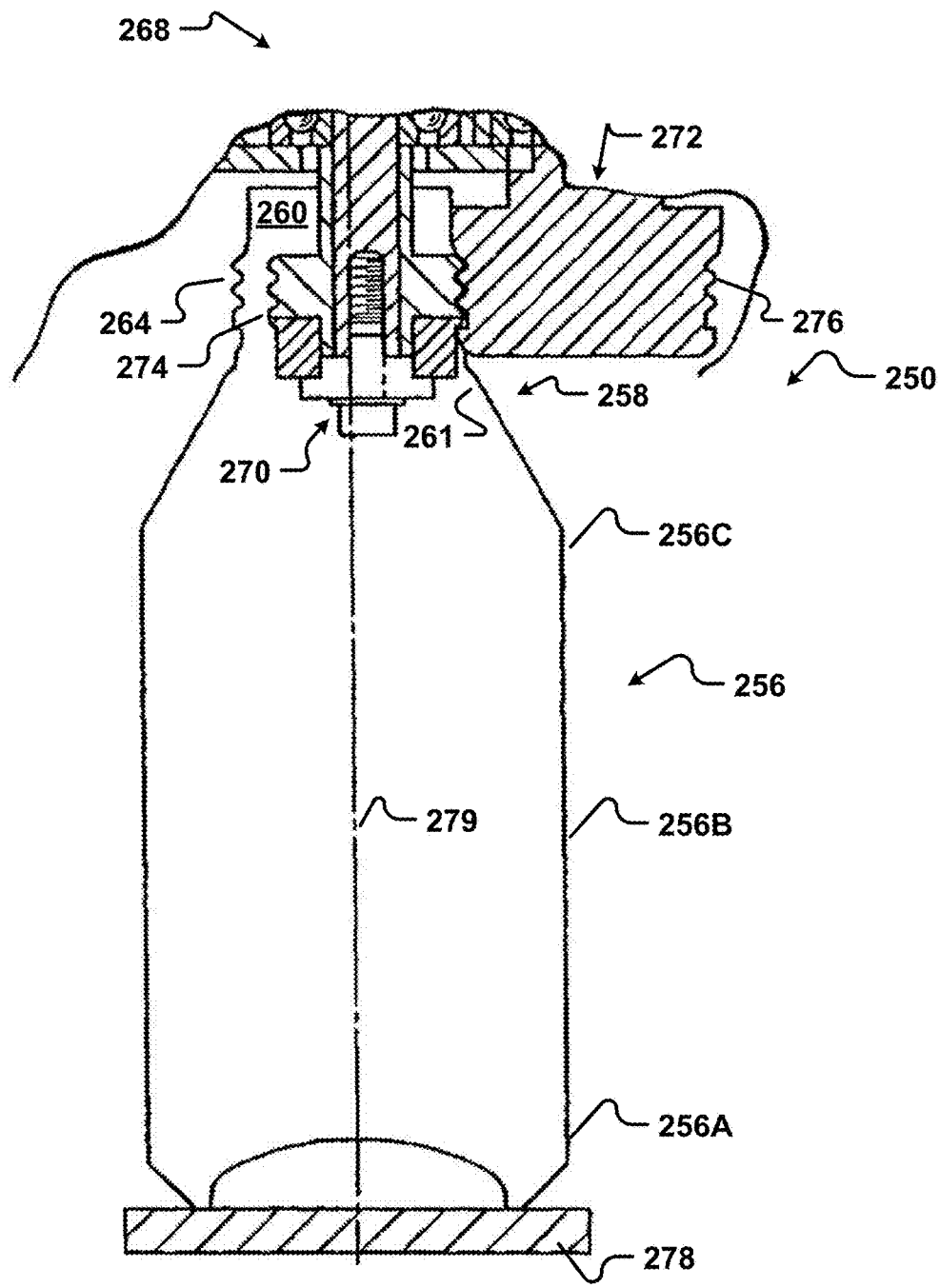

Referring now to FIG. 4B, the thread forming device 268 has been moved into operable contact with the metallic bottle 250. In some embodiments, the metallic bottle 250 may be moved into contact with the thread forming device 268. The metallic bottle 250 is positioned in a chuck 278 to support the metallic bottle 250 and hold the metallic bottle 250 in a predetermined position. The thread forming surface 274 of the inner piece 270 contacts and applies a force to the interior surface 261 of the neck portion 258 and the thread forming surface 276 of the outer piece 272 contracts and applies a force to an exterior surface of the neck portion 258. The surfaces 274, 276 of the inner and outer pieces 270, 272 thus apply a compressive force therebetween to form the threads 264 of a predetermined size, shape, and geometry to the neck portion 258 of the metallic bottle. While the threads 264 are formed, the thread forming device 268 rotates around the axial center 279 of the metallic bottle 250 so that the inner core piece 270 and the outer core piece 272 move around a circumference of the neck 258 of the metallic bottle 250.

Traditional threading machines used to form threads in metallic bottles are commercially available and the same or similar tools used to form threads in D&I cans and bottles may be utilized in the present invention. Examples of threading machines and tools used to form threads in metallic bottles are commercially available as appreciated by one skilled in the arts. Methods and apparatus used to thread metal containers are disclosed in the following publications which are all incorporated herein in their entirety by reference: U.S. Patent Application Publication No. 2012/0269602, U.S. Patent Application Publication No. 2010/0065528, U.S. Patent Application Publication No. 2010/0326946, U.S. Pat. No. 8,132,439, U.S. Pat. No. 8,091,402, U.S. Pat. No. 8,037,734, U.S. Pat. No. 8,037,728, U.S. Pat. No. 7,798,357, U.S. Pat. No. 7,555,927, U.S. Pat. No. 7,824,750, U.S. Pat. No. 7,171,840, U.S. Pat. No. 7,147,123, U.S. Pat. No. 6,959,830, and International Application No. PCT/JP2010/072688 (publication number WO/2011/078057). In one embodiment, threads 264 may be formed on an exterior surface of the neck 258 of the metallic bottle 250 as described in U.S. patent application Ser. No. 14/212,545 which is incorporated herein in its entirety by reference. In another embodiment, threads may be formed on an interior surface of the neck of the metallic bottle 250 which are adapted to receive a threaded closure as described in U.S. Provisional Patent Application No. 61/937,125, which is incorporated herein in its entirety by reference. The tools used during the dome forming 222, necking 224, shaping 226, embossing 228, trimming 230, curling 232, mouth mill 234, and thread forming 235 may include one or more holding parts, pressing tools, first drawing dies, second drawing dies, trimming tools, cutters, turning-back dies, bending dies, thread forming tools, and rollers.

FIG. 5A illustrates threads 264 that have been integrally formed on an exterior surface of the neck portion 258 of the metallic bottle 250 according to one embodiment of the present invention. The threads 264 are adapted to receive a closure, such as a ROPP closure, to seal the opening 260 of the metallic bottle 250. Alternatively, threads may be formed on an interior surface of the neck portion 258 to receive a threaded closure which is inserted into the opening 260 of the metallic bottle 250. The threads 264 have helical ridges 280 and have a size, shape, alignment, and geometry similar to threads of glass containers which are generally known in the art as disclosed in drawings produced and distributed by the Glass Packaging Institute (GPI), including GPI drawing number 5457 for glass finish number 545 which is incorporated herein in its entirety by reference. In one embodiment, the threads 264 have the dimension, shape, geometry, and alignment of threads described in GPI drawing number 5457. In one embodiment, the threads 264 have an exterior diameter 282 between approximately 1.44 inches and approximately 1.54 inches. In another embodiment, the threads 264 have an exterior diameter 282 between approximately 1.24 inches and approximately 1.34 inches. In yet another embodiment, the threads 264 have an exterior diameter 282 between about 1.05 inches and about 1.15 inches. The threads have a pitch 284, or distance from the crest of one thread 264 to the crest of the next thread 264, of approximately 0.125 inches, or eight threads per inch.

Sealing surfaces are formed on an uppermost surface portion 286 of the bottle 250. The sealing surfaces are adapted to be rigid and dimensionally consistent to contact a liner, polymer sealing surface, or gasket in an interior portion of a closure interconnected to the bottle 250, as discussed below in conjunction with FIG. 7. The uppermost surface portion 286 is substantially parallel to the bottom dome portion 254 of the metallic bottle 250. In another embodiment, a throttle curl is formed on the sealing surface of the upper surface 286 of the metallic bottle 250. Throttle curling is an operation that better defines or changes the shape and dimensions of the curl. In one embodiment, throttle curling is performed to change the curl radius to create a better seal surface. In yet another embodiment, the sealing surfaces of the metallic bottle 250 have the dimensions and geometry described in GPI drawing number 5457. In one embodiment, an interior surface portion of the uppermost surface 286 has a maximum radius of curvature of approximately 0.031 inches.

Figure 5B:
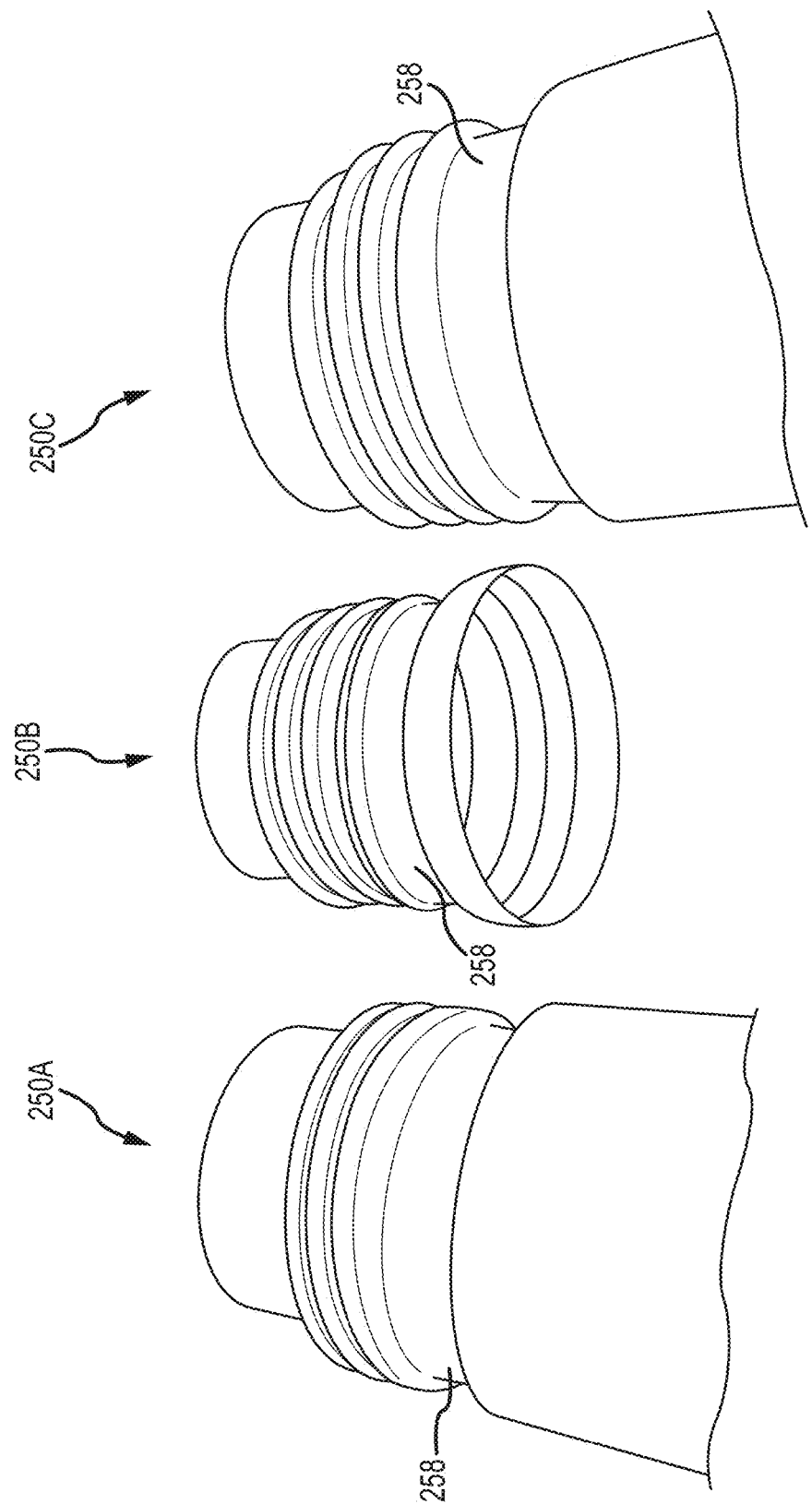
FIG. 5B is a fragmented prospective view of threaded neck designs of metallic bottles manufactured by impact extrusion according to certain embodiments of the present invention.

Although various dimensions have been provided to describe the threads 264 and the metallic bottle 250, it is expressly contemplated that dimensions of the metallic bottle 250 and the placement, dimensions, spacing, and geometry of the threads 264 may be varied and still comport with the scope and spirit of the present invention. Metallic bottles 250A, 250B, and 250C manufactured according to embodiments of the present invention with integral threads 264 are illustrated in FIG. 5B.

Inspections and Packaging

Returning to FIG. 2, inspections 236 may optionally be performed on the metallic bottles 250. Inspections may include camera testing, pressure testing, or other suitable testing. The metallic bottles 250 may be packaged. Optionally, the metallic bottles 250 may be bundled 238. When bundling 238, the metallic bottles 250 may be arranged in groups. The group size may vary and in some embodiments, the group size is about 100 metallic bottles 250. The size of the group may depend upon the diameter of the metallic bottles 250. The groups may be bundled using plastic strapping or other similar known processes. A special consideration for recycled aluminum alloy containers is that the strap tension must be controlled in order to prevent heel denting in high contact pressure areas of the bundle. In an alternative packaging method, the metallic bottles 250 are bulk palletized 240 similar to other beverage containers, such as beverage cans.

Filling and Sealing

Figure 6A:
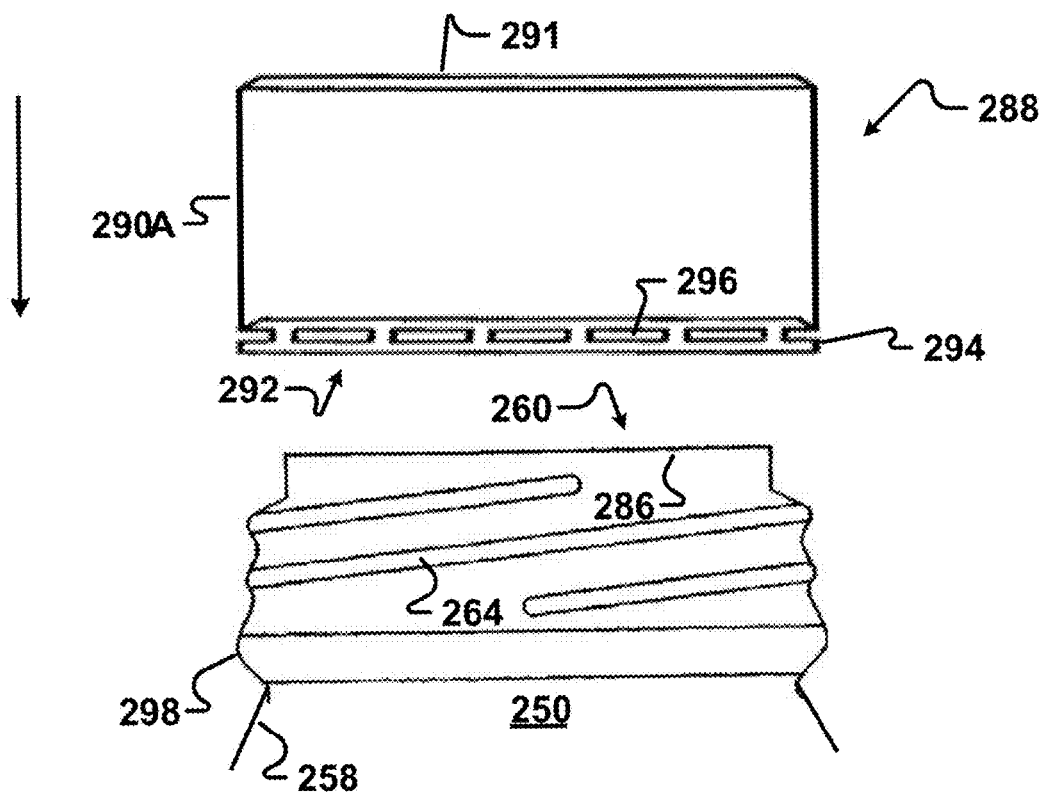
FIGS. 6A and 6B illustrate a method of sealing a metallic bottle with a closure according to one embodiment of the present invention.
Figure 6B:
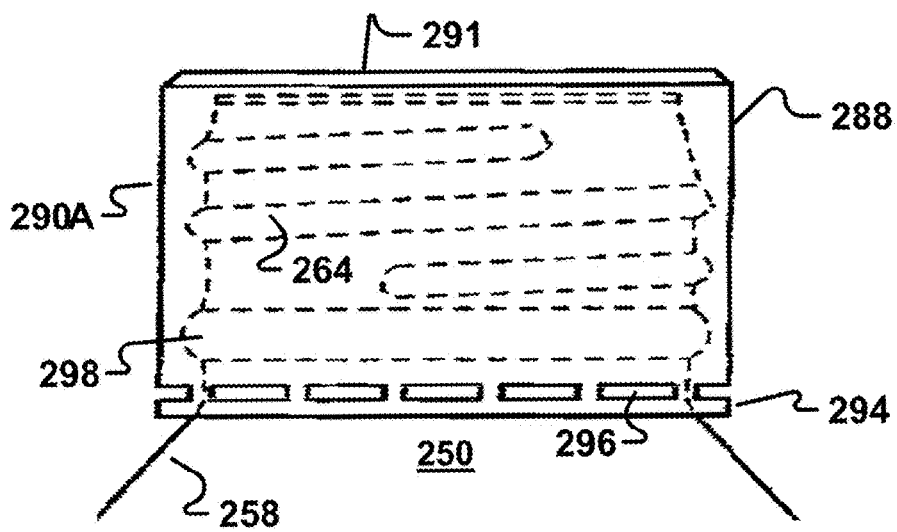

The empty metallic bottles 250 are filled 242 with a beverage. After the metallic bottle 250 is filled with a beverage, a closure, such as a ROPP closure 288, is placed over the neck portion 258 of the metallic bottle 250 and interconnected to the metallic bottle 250 to seal the opening 260 as illustrated in FIGS. 6A and 6B and threads are formed on the ROPP closure 288 as illustrated in FIG. 7. Before the ROPP closure 288 is placed on the metallic bottle 250, the ROPP closure 288 has an unthreaded body portion 290A that is generally cylindrical. The ROPP closure 288 has a top portion 291 with a generally circular shape and a downward facing aperture 292 with an interior diameter predetermined to fit over the threads 264 of the metallic bottle 250. A detachable pilfer band 294 is optionally formed on a lower portion of the body portion 290 of the ROPP closure 288. The detachable pilfer band 294 is formed by cutting a series of serrations 296 into the lower portion of the body portion 290A. The detachable pilfer band 294 is adapted to fit over a pilfer band skirt 298 formed on the neck portion 258 of the metallic bottle 250 axially lower than the threads 264. In one embodiment (not illustrated), the pilfer band skirt 284 is formed from a lower portion of the threads 264. The unthreaded ROPP closure 288 is positioned over the neck portion 258 of metallic bottle 250 as illustrated in FIG. 6B.

A capping apparatus 302, illustrated in FIG. 7, forms threads 308 on the ROPP closure 288 to seal the opening 260 of the metallic bottle 250. In one embodiment of the present invention, the capping apparatus 302 is operable to position the unthreaded ROPP closure 288 over the neck portion 258 of the metallic bottle 250. The capping apparatus 302 has a pressing block 304 that includes a chuck operable to hold and compress a top portion 291 of the ROPP closure 288 downwardly. One or more thread rollers 306 of the capping apparatus 302 are positioned in contact with an exterior surface of the body portion 290 of the ROPP closure 288. The thread rollers 306 are operable to rotate around the exterior of the ROPP closure 288 and apply a compressive force to the body portion 290. Threads 308 are formed on the ROPP closure 288 by the thread rollers 306 as they press against and wind the body portion 290 along the threads 264 of the metallic bottle 250. The thread rollers 306 generally start at the top of the threads 264 of the metallic bottle 250 and work downwardly around the ROPP closure 288. The capping apparatus 302 may include a compressing block 312 to press against the exterior top portion 291 of the ROPP closure 288. Contact between the sealing surfaces on the upper portion 286 of the metallic bottle 250 and the liner 314 in the interior portion of the ROPP closure 288 compress the liner 314 and seal the metallic bottle 250 and prevent leakage of liquid or gas from the bottle 250. FIG. 7 also illustrates a curl 316 formed on the upper portion 286 of the metallic bottle 250. In one embodiment, the curl 316 is formed by the capping apparatus 302 bending the upper portion 286 of the metallic bottle 250 outwardly.

The capping apparatus 302 also includes one or more pilfer rollers 310 that can also rotate around the exterior of the ROPP closure 288. The pilfer rollers 310 press against an exterior surface of the pilfer band 294 to decrease the interior diameter of the pilfer band 294 of the ROPP closure 288. The pilfer band skirt 298 of the bottle 250 thus has an outer diameter greater than an interior diameter of the detachable pilfer band 294. The pilfer band skirt 298 prevents the pilfer band 294 from being removed from the bottle when the ROPP closure 288 is rotated to open the metallic bottle 250. When a rotational force is applied to unthread the ROPP closure 288 from the metallic bottle 250, the detachable pilfer band 294 contacts the pilfer band skirt 298 preventing the detachable pilfer band 294 from sliding over the pilfer band skirt 298. As rotational force continues to be applied to the ROPP closure 288, the serrations 296 of the ROPP closure 288 (illustrated in FIG. 6A) fracture or sever and the detachable pilfer band 294 is retained on the neck portion 258 of the metallic bottle 250 identifying to the consumer that the ROPP closure 288 has been opened and the seal to the metallic bottle 250 compromised. After the ROPP closure 274 is removed from the metallic bottle 250, the ROPP closure 274 may be threaded back onto the neck 258 of the metallic bottle 250 to reestablish the seal of the metallic bottle 250 to prevent contents therein spilling.

Referring now to FIG. 8, two examples of metallic bottles 250D, 250E of embodiments of the present invention are illustrated. The bottles may be adapted to receive ROPP closures of any diameter. In one embodiment, the diameter of the ROPP closure 288 is approximately 1.5 inches. In another embodiment, the diameter of the ROPP closure 288 is approximately 1.3 inches. In still another embodiment, the diameter of the ROPP closure 288 is approximately 1.1 inches. Knurls have been formed on the ROPP closures 318 to provide a gripping surface for a consumer. In one embodiment, metallic bottle 250D has a volume predetermined to hold approximately 12 ounces of a product. In another embodiment, metallic bottle 250E has a volume predetermined to hold about 16 ounces of a product.

EXAMPLES

Figure 9:
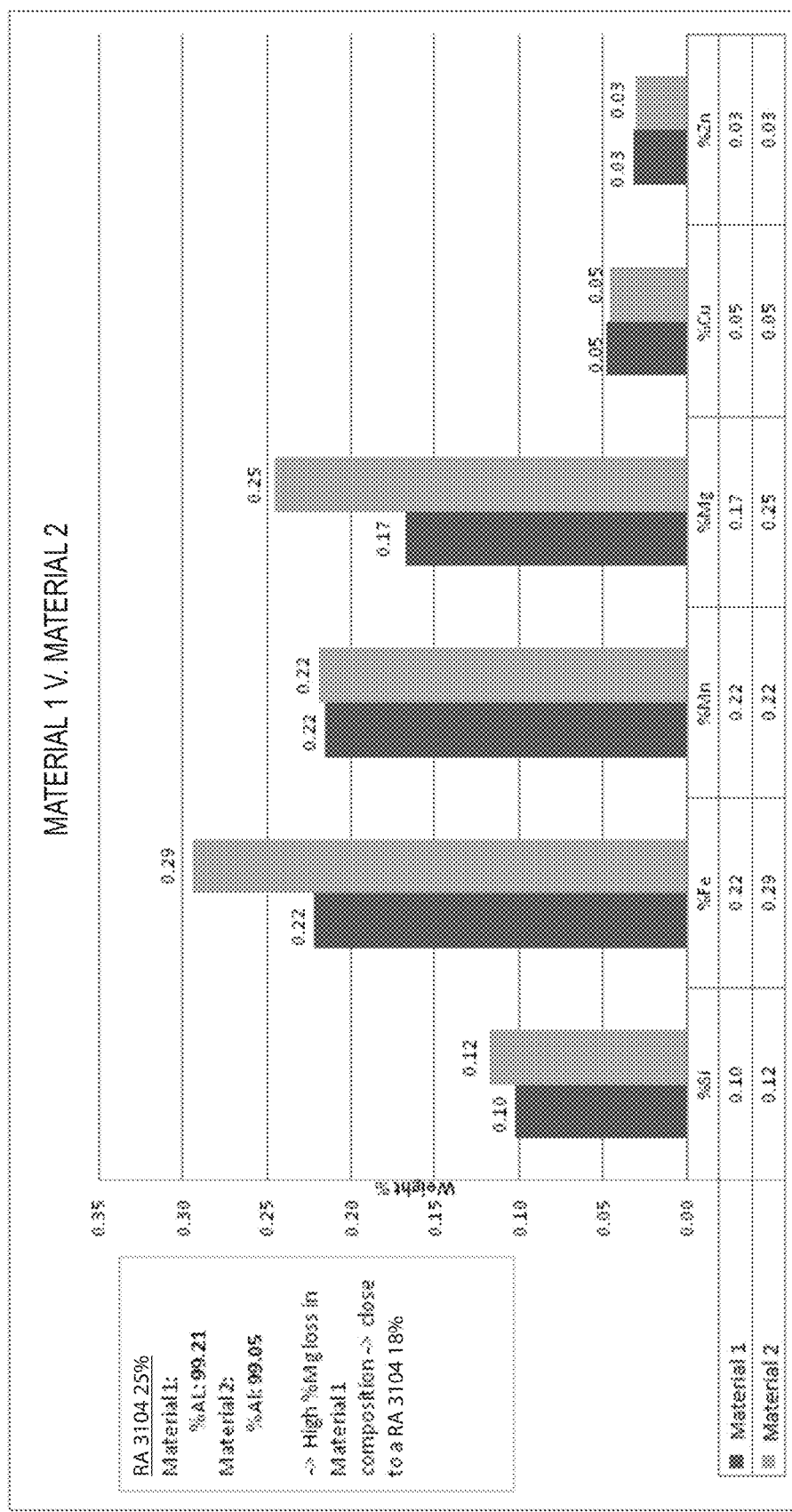
FIG. 9 illustrates an alloy composition and comparison of Material 1 and Material 2.

Slugs of two materials were tested. The slugs were made from 25% recycled aluminum alloy 3104 and 75% of an aluminum alloy. Material 1 used remelt secondary ingots (RSI) produced from a briquetted scrap from a cupping press. Material 1 samples were made at the Ball Advanced Aluminum Technology plant in Sherbrook, Canada. Material 2 melted briquette scrap. Material 2 samples were made at Copal, S.A.S. in France. FIG. 9 illustrates a comparison of Material 1 versus Material 2. Material 1 is much closer to 18% 3104 cupper scrap content due to a significant loss of magnesium compared to the slug composition of Material 2. The processing type to melt the briquetted 3104 cupper scrap may have an influence on the final chemical composition of recycled aluminum alloy material. The finish treatment for Material 1 samples was shot blasted. The finish for Material 2 samples was tumbled.

Table 6 illustrates the slug hardness for reference material 1050, Material 1 and Material 2 after finishing.

TABLE 6

| | Alloy | | |
|---|---|---|---|
| | 1050 (reference) | Material 1 | Material 2 |
| Hardness (HB) | 21.5 | 29 | 30.7 |

Due to the finishing, the values given in Table 6 may be higher than those measured after annealing process. Material 1 had a hardness that was approximately 35% greater than the reference material 1050, while Material 2 had a hardness that was approximately 43% greater than 1050.

Table 7 illustrates the lubrication parameters and lubrication weight for 100 kg of slugs for a reference material 1050, Material 1, and Material 2. Note that the lubrication material for the reference material 1050 was different from the lubrication used for the slugs comprising Material 1 and Material 2.

TABLE 7

| | Lubrication parameters for 220 lb of slugs | | |
|---|---|---|---|
| | 1050 (reference) | Material 1 | Material 2 |
| Lubricant weight (oz) | 3.53 | 4.41 | 3.88 |
| Time of tumbler rotation (min) | 30 | 30 | 30 |

The lubrication process was performed on an offline tumbler for all slugs. The difference in lubricant ratio is due to the type of surface treatment (tumbled surface requires less lubricant than shot-blasted surface treatments). The monobloc die used was a standard sintered carbide GJ15-1000HV. The shape of the die was conical. The punch head was a Bohler S600-680HV.

Tubes were brushed to highlight potential visual score marks and scratches. The internal varnish on the containers was Epoxy-phenolic. The setting of the application of the internal Epoxy-phenolic varnish was standard. Temperature and time of curing was about 482° F. during about 8 min 30 s. There were no issues of porosity at following the internal varnish. White base coat with gloss was applied to the containers. A printed design was also added to the containers.

Example 1

Example 1 utilized Material 1 and Material 2 with slugs that had a diameter of about 1.7579 in and a height of about 0.2165 in. The mass of the slug material was about 0.820 oz. The final dimension of the container following processing, but prior to trimming, was about 5.9055 in.+/−about 0.3937 in. in height by about 1.7772 in. in diameter. The thickness of the final container was about 0.0110 in.+/−0.0012 in. The final mass of the container was about 0.819 oz. A standard necking tooling was used.

After using Material 2 slugs, the punch head needed to be changed because it was worn. A larger punch may be required to meet the container parameters.

Example 2

Example 2 utilized Material 1 and Material 2 with slugs that had a diameter of about 1.7579 in. and a height of about 0.1969 in. The mass of the slug material was about 0.745 oz. The final dimensions of the container following processing, but prior to trimming was about was about 5.9055 in+/− about 0.3937 in. in height by about 1.7772 in. in diameter. The thickness of the final container was about 0.0094 in.+/−0.0012 in. The final mass of the container was about 0.728 oz. A larger diameter pilot was used. The diameter of the pilot was about 0.0039 in. larger.

Figure 10:
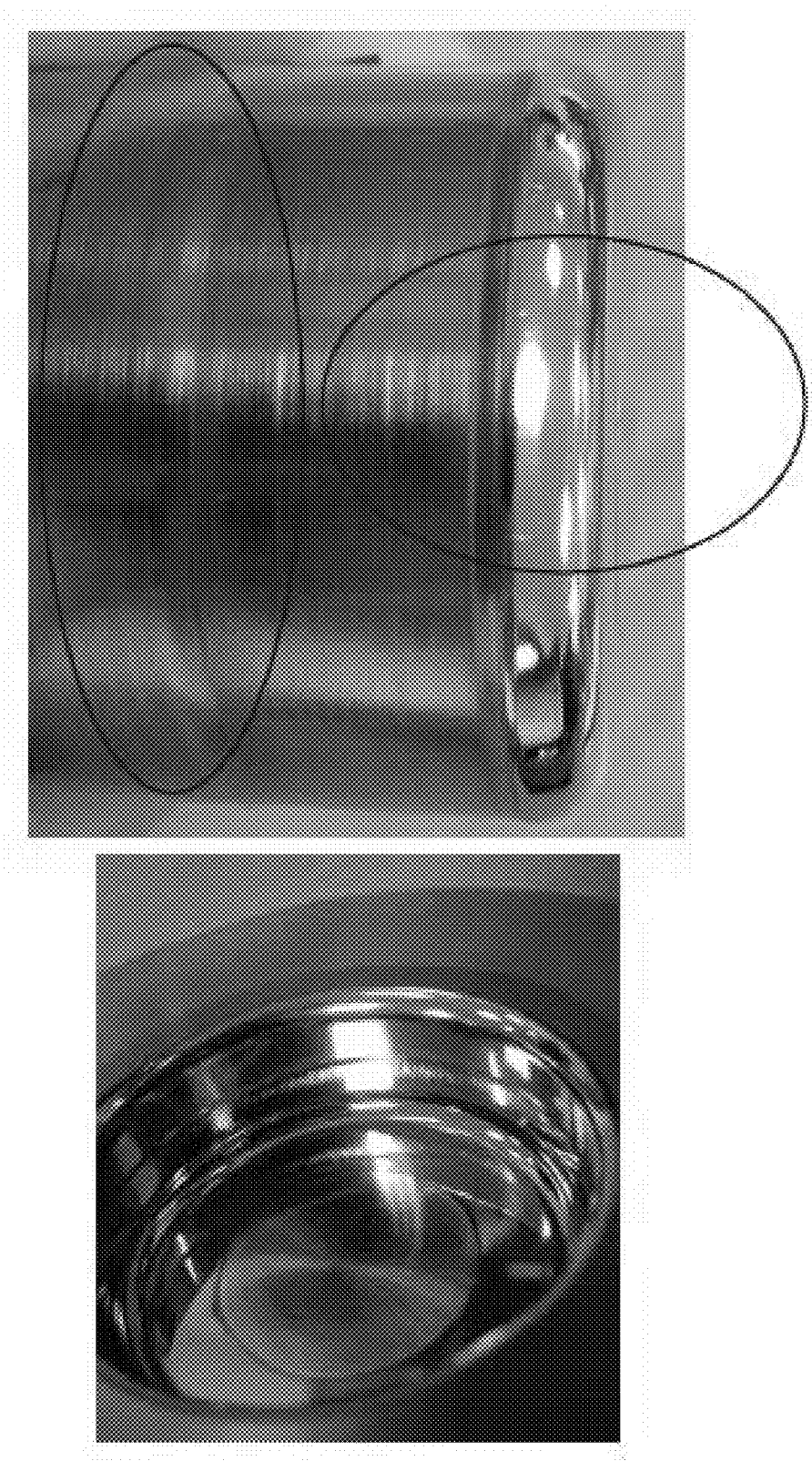
FIG. 10 illustrates a punch head and press die used in various embodiments of the present invention.

Almost no eccentricity in wall thicknesses (< about 0.00079) occurred due to the use of a brand new press die and a punch head. Once again, the slugs from Material 1 appear to perform better than Material 2 slugs. Indeed, similar than the results from Experiment 1, almost no scratches were visible neither inside nor outside the containers with Material 1. When Material 2 slugs were used, scratches appeared after 6,000-7,000 cans from time to time on the exterior of the container and mainly on the inside of the container. Additionally, the punch head was significantly worn. FIG. 10 illustrates a steel punch head and a sintered carbide press die used in various embodiments of the present invention. The punch head surface after pressing all Material 1 slugs was without any score mark on it. As shown in FIG. 10, the press die in sintered carbide was greatly damaged throughout the perimeter. Press speed lines for both experiments were at about 69 inches per minute and both experiments ran without major stops.

Table 8 illustrates the extrusion force for samples made using the parameters discussed in Experiment 1 for Materials 1 and 2 and Experiment 2 for Material 1 and 2. A reference material of 1050 is also shown.

TABLE 8

| | Alloy | | |
|---|---|---|---|
| | 1050 (reference) | Material 1 | Material 2 |
| Example 1 Extrusion Force (kN) | 1050-1100 | 1090-1150 | 1100-1170 |
| Example 2 Extrusion Force (kN) | — | 1130-1200 | 1150-1300 |

There was no significant increase of extrusion power across the samples, regardless of the material or the starting dimensions of the slugs. The values are far below the safe limit for the final container size.

Table 9 illustrates the tube parameters for Materials 1 and 2 using the slug dimensions of Experiment 1 and the tube parameters for Materials 1 and 2 using the slug dimensions of Experiment 2.

TABLE 9

| | Tube Parameters | | | |
|---|---|---|---|---|
| | Bottom Thickness (in.) | Bottom Wall Thickness (in.) | Top Wall Thickness (in.) | Trimmed length (in.) |
| Tolerance | 0.0276-0.0315 | 0.0106-0.0122 | 0.0133-0.0150 | min. 0.0787 |
| 1050 (reference) | 0.0295 | 0.0112 | 0.0138 | 0.1575-0.2362 |
| Material 1 Experiment 1 | 0.0303 | 0.0112 | 0.0138 | 0.1969-0.2756 |
| Material 2 Experiment 1 | 0.0287 | 0.0114 | 0.0138 | 0.1575-0.2362 |
| Material 1 Experiment 2 | 0.0287 | 0.0094 | 0.0126 | 0.3937-0.4331 |
| Material 2 Experiment 2 | 0.0268 | 0.0096 | 0.0128 | 0.3543-0.3937 |

As illustrated in Table 9, the bottom thickness was within the tolerance for each material except for Material 2, Experiment 2. The bottom wall thickness tolerance and the top wall thickness tolerance were not achieved for either Experiment 2 material.

Table 10 illustrates the bulging depth (in.) and the porosity in milli-amps (mA), which is a measure of the integrity of the interior coating.

TABLE 10

| | Alloy | | |
|---|---|---|---|
| | 1050 (reference) | Material 1 | Material 2 |
| Experiment 1 | 0.3228 in./ 1.6 mA | 0.3150 in./ 16 mA | 0.2992 in./ 1 mA 0.2953 in./2 mA |
| Experiment 2 | — | 0.2992 in./0.8 mA | 0.2992 in./ 14 mA 0.2874 in./ 2.3 mA |

Tubes with the dimensions of Experiment 1 and Experiment 2 parameters were necked properly with both Material 1 and Material 2 slugs. New pilots were needed to run lightweight cans. The necking shape and all dimensional parameters remained within specification. The chimney thickness (about 0.0177 in. to about 0.0189 in. with white basecoat) before curling was sufficiently thick. Furthermore, the trim length at necking was satisfactory at about 0.0945.

Slugs made from both Material 1 and Material 2 created porosity after the bulging at the necking station. After decreasing bulge depth, the porosity level came back to normal. Furthermore, decreasing the bulging depth for a second time with Material 2 helped to resolve porosity issues.

Figure 11:
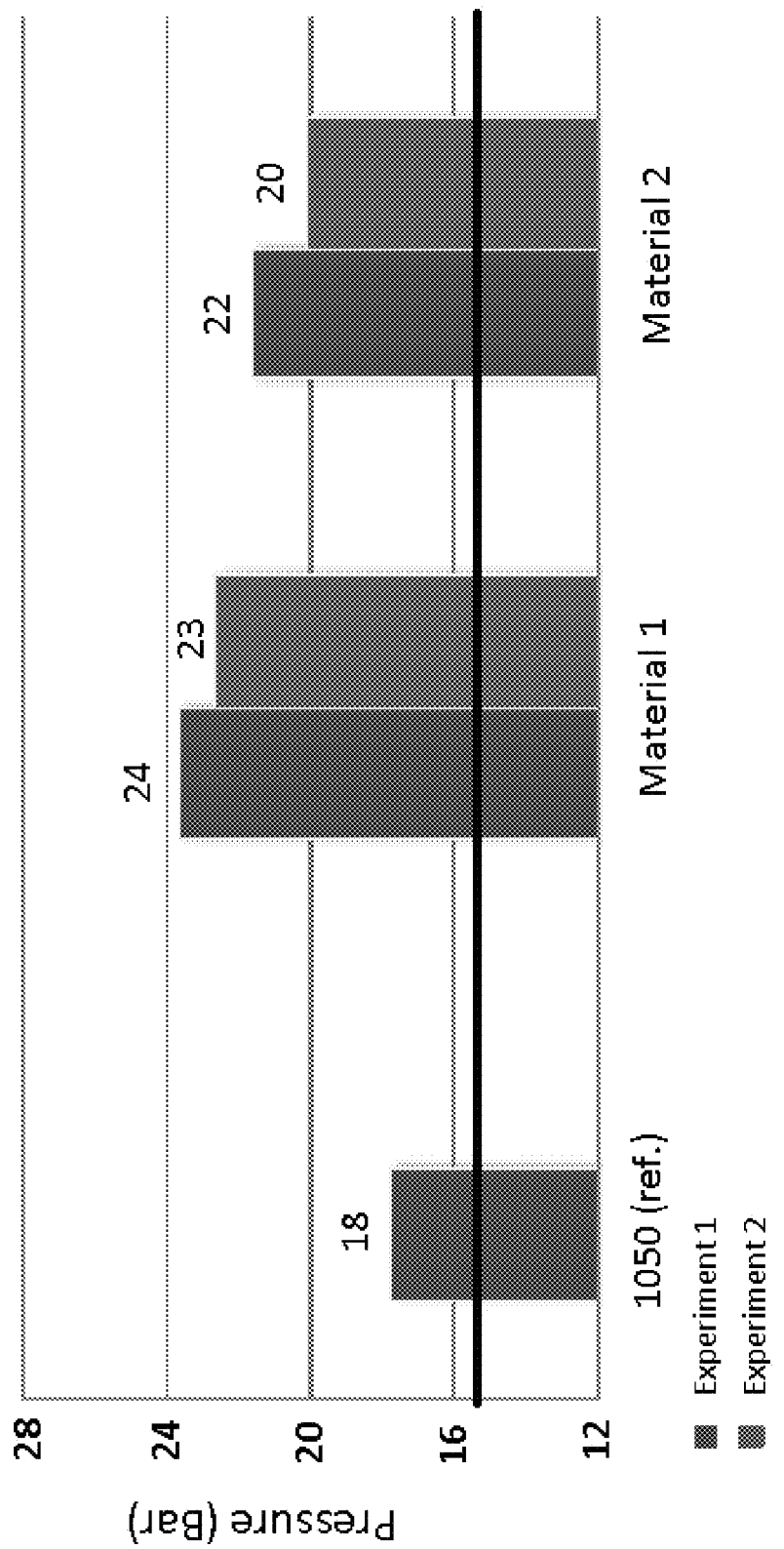
FIG. 11 illustrates deformation pressure resistance for containers made with Material 1 and Material 2.
Figure 12:
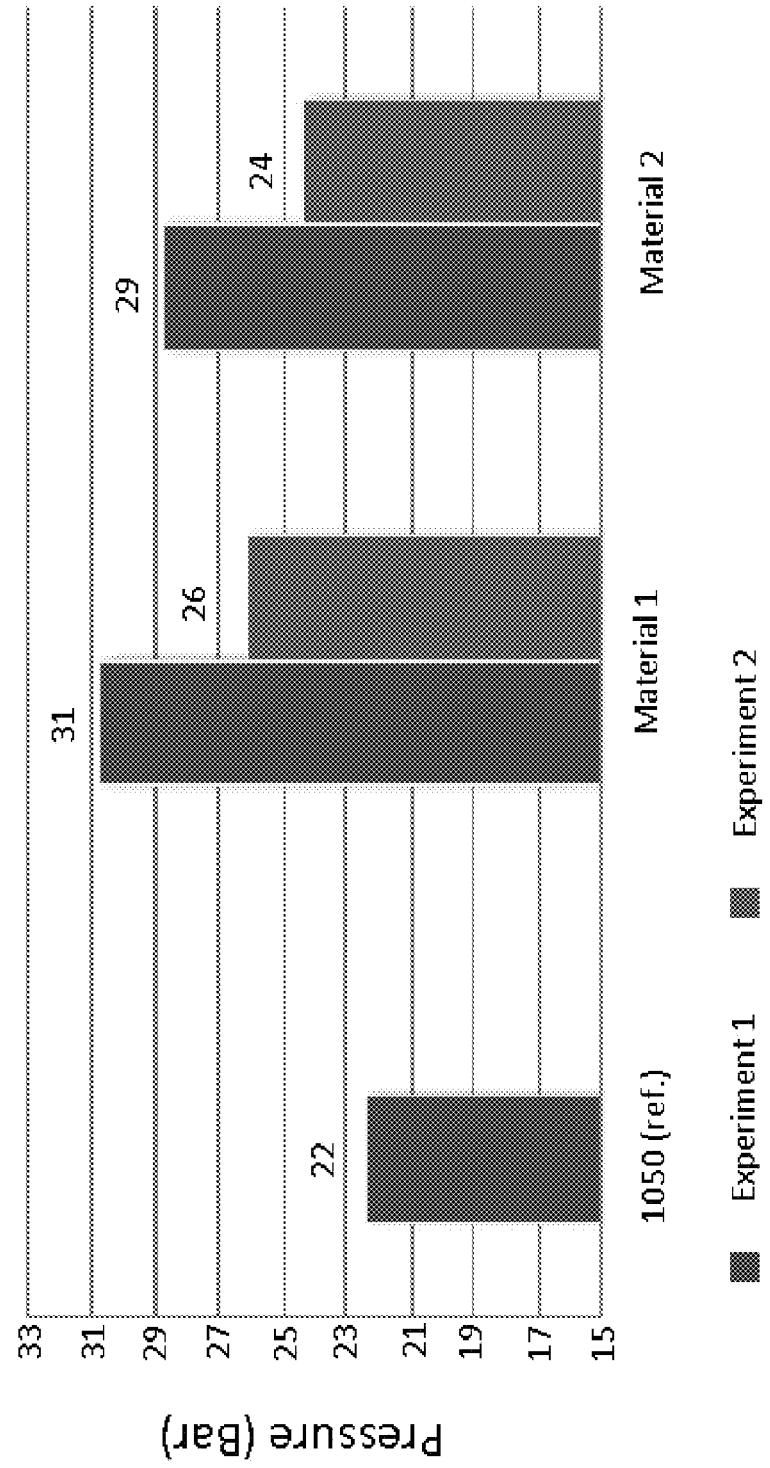
FIG. 12 illustrates burst pressure resistance for Material 1 and Material 2.
Figure 13:
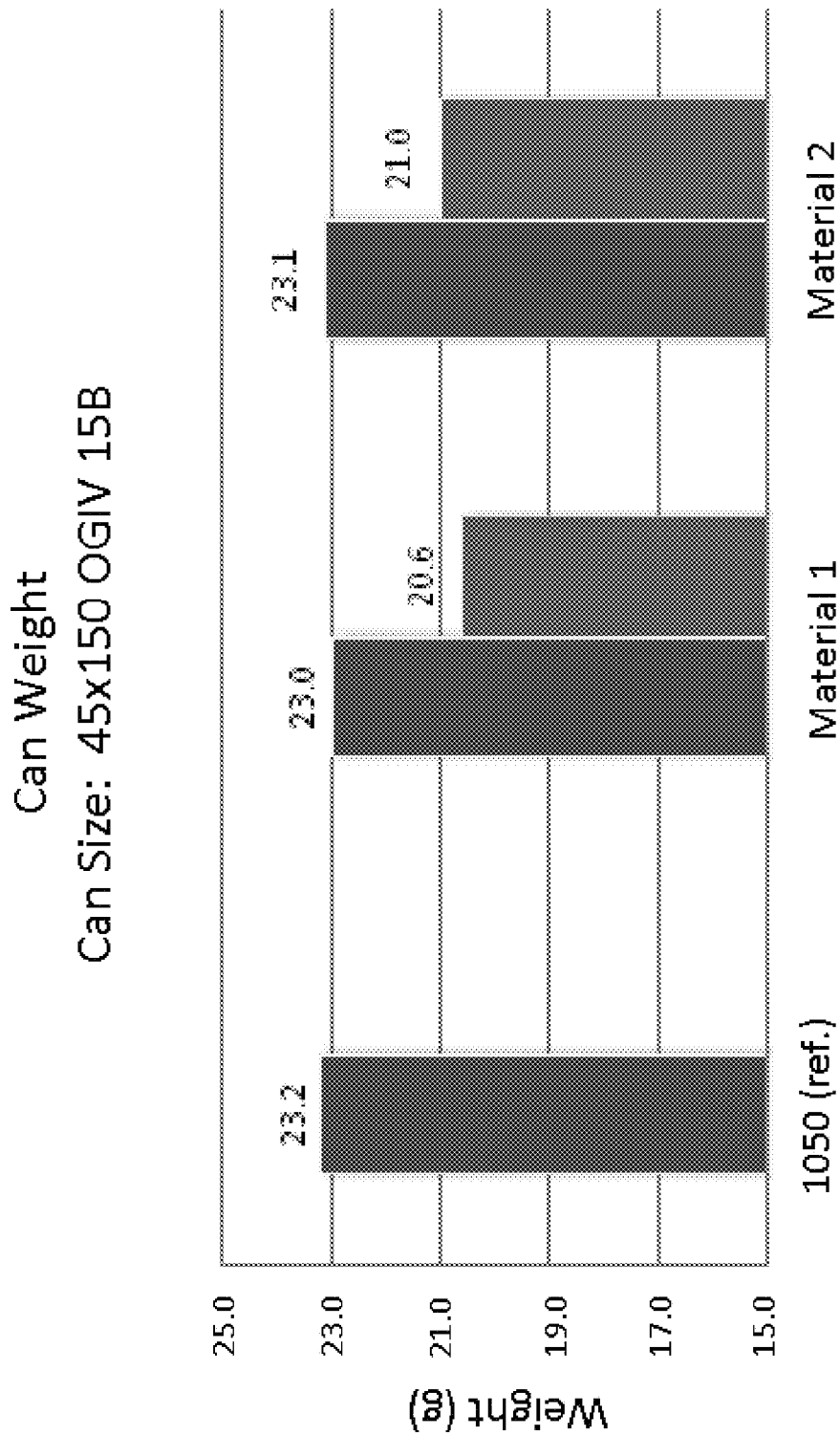
FIG. 13 illustrates container mass for sample Material 1 and sample Material 2.

Regarding pressure resistance, results are very impressive even for the lightweight cans. Surprisingly, Material 1 slugs have higher pressure resistance (about +2 bars) even if they have lower percentage of magnesium and percentage of iron than the Material 2 ones. Though the cause is unclear, it may be a consequence of the continuous annealing performed in Material 1 versus the batch annealing. FIG. 11 illustrates first deformation pressure resistance for cans, while FIG. 12 illustrates the burst pressure for cans. FIG. 13 illustrates the container masses and alloy compositions.

Table 11 illustrates the results of a test of the column strength of the threads of IE containers made with standard (1070) aluminum alloy compared with the column strength of threads of D&I containers measured in lbf. The D&I containers exhibited a much greater axial load capacity due to the alloy's higher strength properties. This table illustrates the problem of forming a threaded neck in a metal bottle manufactured by impact extrusion using standard aluminum alloys.

TABLE 11

| | D&I container | IE container |
|---|---|---|
| 1 | 435.5 lbf | 170.4 lbf |
| 2 | 417.8 lbf | 168.5 lbf |
| 3 | 441.0 lbf | 169.5 lbf |
| Average | 431.4 lbf | 169.5 lbf |

Table 12 compares the thread depth of threads of IE containers made with standard (1070) aluminum alloy compared with threads of D&I containers measured in inches.

TABLE 12

| | D&I container | IE container |
|---|---|---|
| 1 | 0.0302 in. | 0.0338 in. |
| 2 | 0.0282 in. | 0.0349 in. |
| 3 | 0.0278 in. | 0.0357 in. |
| 4 | 0.0292 in. | 0.0300 in. |
| 1 | 0.0304 in. | 0.0352 in. |
| 2 | 0.0274 in. | 0.0337 in. |
| 3 | 0.0268 in. | 0.0321 in. |
| 4 | 0.0292 in. | 0.0302 in. |
| Average | 0.0287 in. | 0.0332 in. |

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A process for manufacturing a threaded impact extruded metallic bottle for a beverage, comprising:
    forming a slug with an aluminum alloy, said aluminum alloy blended from approximately 60% of a scrap aluminum alloy and approximately 40% of a 1070 aluminum alloy, wherein said scrap aluminum alloy comprises:
        between about 0.20 wt. % Si and about 0.32 wt. % Si;
        between about 0.47 wt. % Fe and about 0.59 wt. % Fe;
        between about 0.10 wt. % Cu and about 0.22 wt. % Cu;
        between about 0.78 wt. % Mn and about 0.90 wt. % Mn;
        between about 0.54 wt. % Mg and about 0.66 wt. % Mg;
        between about 0.06 wt. % Zn and about 0.18 wt. % Zn;
        between about 0.00 wt. % Cr and about 0.08 wt. % Cr; and
        between about 0.00 wt. % Ti and about 0.08 wt. % Ti;
    deforming said slug into a preferred shape in an impact extrusion process to form said metallic bottle; and
    forming threads on a neck portion of said metallic bottle, said threads configured to receive a threaded closure which can be selectively opened and closed after said metallic bottle is filled with the beverage.

2. The process of claim 1, wherein said scrap aluminum alloy is comprised of a scrap metal of at least one of a 3104, a 3004, a 3003, a 3103, a 3013 and a 3105 aluminum alloy.

3. The process of claim 2, wherein a titanium boride material is added to said aluminum alloy.

4. The process of claim 3, wherein forming said slug further comprises forming individual slugs from a slab formed from a casting apparatus, and annealing said individual slugs in a continuous annealing process.

5. The process of claim 1, wherein said aluminum alloy comprises:
    between about 97.7 wt. % aluminum and about 98.50 wt. % aluminum;
    between about 0.16 wt. % Si and about 0.24 wt. % Si;
    between about 0.37 wt. % Fe and about 0.48 wt. % Fe;
    between about 0.08 wt. % Cu and about 0.15 wt. % Cu;
    between about 0.48 wt. % Mn and about 0.71 wt. % Mn;
    between about 0.34 wt. % Mg and about 0.52 wt. % Mg;
    between about 0.06 wt. % Zn and about 0.12 wt. % Zn;
    between about 0.01 wt. % Cr and about 0.04 wt. % Cr; and
    between about 0.00 wt. % Ti and about 0.04 wt. % Ti.

6. The process of claim 1, wherein said aluminum alloy consists of:
    about 98.33 wt. % aluminum;
    about 0.18 wt. % Si;
    about 0.39 wt. % Fe;
    about 0.10 wt. % Cu;
    about 0.51 wt. % Mn;
    about 0.37 wt. % Mg;
    about 0.08 wt. % Zn;
    about 0.02 wt. % Cr; and
    about 0.02 wt. % Ti.

7. The process of claim 1, wherein said threads have an exterior diameter of between approximately 1.0 inches and approximately 1.6 inches, and wherein said threads have a pitch of between approximately 0.10 inches and approximately 0.15 inches.

8. The process of claim 7, wherein a body portion of said metallic bottle has a thickness between about 0.0098 inches and about 0.0155 inches.

9. The process of claim 8, wherein said metallic bottle has a diameter of between approximately 2.6 inches and approximately 2.85 inches and a height between approximately 6.0 inches and approximately 7.4 inches.

10. The process of claim 1, further comprising annealing said slug within a furnace at a temperature of between about 1,000° F. and about 1,112° F. for between about 5 hours and 9 hours.

11. The process of claim 1, further comprising annealing said slug to a temperature of between about 842° F. and about 1058° F.

12. The process of claim 1, wherein said aluminum alloy comprises:
    between 0.34 wt. % Mg and 0.40 wt. % Mg;
    between 0.16 wt. % Si and 0.20 wt. % Si; and
    between 0.37 wt. % Fe and 0.41 wt. % Fe.

13. A method of impact extruding and threading a neck portion of a metallic bottle formed of a recycled aluminum alloy, comprising:
    providing scrap aluminum material;
    melting said scrap aluminum material with a 1070 aluminum alloy to form said recycled aluminum alloy, wherein said recycled aluminum alloy comprises:
        between 97.70 wt. % aluminum and 98.50 wt. % aluminum,
        between 0.16 wt. % Si and 0.24 wt. % Si,
        between 0.37 wt. % Fe and 0.48 wt. % Fe,
        between 0.08 wt. % Cu and 0.15 wt. % Cu,
        between 0.48 wt. % Mn and 0.71 wt. % Mn,
        between 0.34 wt. % Mg and 0.52 wt. % Mg,
        between 0.06 wt. % Zn and 0.12 wt. % Zn,
        between 0.01 wt. % Cr and 0.04 wt. % Cr, and
        between 0.00 wt. % Ti and 0.04 wt. % Ti;
    casting said recycled aluminum alloy into a slab;
    rolling said slab to a specified thickness;
    cooling said slab at an ambient temperature of between about 59° F. to about 122° F.;
    punching slugs from said cooled slab;
    annealing said slugs, wherein a peak temperature of said slugs is between about 842° F. to about 1058° F.;
    impact extruding the annealed slug to form an extruded tube;
    forming a bottom dome portion on said extruded tube;
    necking said extruded tube to form said metallic bottle, said metallic bottle having said bottom dome portion, a body portion, said neck portion extending upwardly from said body portion, and an opening positioned on an uppermost portion of said neck portion;
    trimming at least a portion of said uppermost portion of said neck portion; and
    forming threads in said neck portion of said metallic bottle, said threads adapted to threadably engage a closure after said metallic bottle has been filled with a beverage, and wherein said metallic bottle is capable of withstanding an interior pressure after being filled and sealed with said closure.

14. The method of claim 13, wherein said recycled aluminum alloy comprises:
    97.88 wt. % aluminum;
    0.22 wt. % Si;
    0.46 wt. % Fe;
    0.13 wt. % Cu;
    0.68 wt. % Mn;
    0.49 wt. % Mg;
    0.10 wt. % Zn;
    0.02 wt. % Cr; and
    0.02 wt. % Ti.

15. The method of claim 13, wherein said threads are formed by a thread forming device, said thread forming device comprising:
- a chuck to hold said metallic bottle in a predetermined position;
- an inner core piece with a first thread forming surface operable to apply a force to an interior surface of said neck portion of said metallic bottle; and
- an outer core piece with a second thread forming surface operable to apply a force to an exterior surface of said neck portion of said metallic bottle, wherein the thread forming device is operable to rotate around an axial center of said metallic bottle.

16. The method of claim 15, further comprising sealing said opening of said metallic bottle with a ROPP closure, said sealing comprising:
- placing a ROPP closure over said threads in said neck portion of said metallic bottle, said ROPP closure comprising a top portion, a generally cylindrical body portion extending downwardly from said top portion, a detachable pilfer band formed on a lowermost portion of said cylindrical body portion, an open aperture facing downward, and a liner in an interior top portion of said ROPP closure, wherein said cylindrical body portion of said ROPP closure is unthreaded;
- pressing said ROPP closure downwardly onto sealing surfaces formed on said uppermost portion of said neck portion of said metallic bottle, wherein said liner of said ROPP closure is compressed between said sealing surfaces and said top portion of said ROPP closure;
- pressing a thread roller against an exterior surface of said cylindrical body portion of said ROPP closure, wherein said thread roller applies a compressive force to said cylindrical body portion and rotates around the ROPP closure to form threads in said cylindrical body portion; and
- pressing a pilfer roller against an exterior surface of said pilfer band to prevent said pilfer band from being removed from said neck portion of said metallic bottle when said ROPP closure is removed from said metallic bottle.

17. The method of claim 13, wherein said impact extruding of said annealed slug to form said extruded tube comprises:
- placing said annealed slug in a die having a conical shape and a hardness of between approximately 920 HV and approximately 1080 HV; and
- impacting said annealed slug with a steel punch having a predetermined shape and a hardness of between approximately 600 HV and approximately 760 HV.

18. The method of claim 13, wherein said slug has a diameter of between about 1.61 inches and about 1.91 inches, a height between about 0.17 inches and about 0.27 inches, and a mass of between about 0.69 ounces and about 0.875 ounces.

19. A method of forming a metallic bottle for a beverage in an impact extrusion process, comprising:
- melting scrap aluminum material with a 1070 aluminum alloy to form a recycled aluminum alloy that comprises:
  - between 97.70 wt. % aluminum and 98.50 wt. % aluminum,
  - between 0.16 wt. % Si and 0.24 wt. % Si,
  - between 0.37 wt. % Fe and 0.48 wt. % Fe,
  - between 0.08 wt. % Cu and 0.15 wt. % Cu,
  - between 0.48 wt. % Mn and 0.71 wt. % Mn,
  - between 0.34 wt. % Mg and 0.52 wt. % Mg,
  - between 0.06 wt. % Zn and 0.12 wt. % Zn,
  - between 0.01 wt. % Cr and 0.04 wt. % Cr, and
  - between 0.00 wt. % Ti and 0.04 wt. % Ti;
- forming a slug with the recycled aluminum alloy;
- deforming the slug into a preferred shape in an impact extrusion process to form the metallic bottle; and
- forming threads on a neck portion of the metallic bottle, the threads configured to receive a threaded closure which can be selectively opened and closed after the metallic bottle is filled with the beverage.

20. The method of claim 19, wherein said scrap aluminum material comprises:
- between about 0.20 wt. % Si and about 0.32 wt. % Si;
- between about 0.47 wt. % Fe and about 0.59 wt. % Fe;
- between about 0.10 wt. % Cu and about 0.22 wt. % Cu;
- between about 0.78 wt. % Mn and about 0.90 wt. % Mn;
- between about 0.54 wt. % Mg and about 0.66 wt. % Mg;
- between about 0.06 wt. % Zn and about 0.18 wt. % Zn;
- between about 0.00 wt. % Cr and about 0.08 wt. % Cr; and
- between about 0.00 wt. % Ti and about 0.08 wt. % Ti.

21. The method of claim 19, wherein the recycled aluminum alloy comprises:
- between about 97.88 wt. % aluminum and about 98.33 wt. % aluminum;
- between about 0.18 wt. % Si and about 0.22 wt. % Si;
- between about 0.39 wt. % Fe and about 0.46 wt. % Fe;
- between about 0.10 wt. % Cu and about 0.13 wt. % Cu;
- between about 0.51 wt. % Mn and about 0.68 wt. % Mn;
- between about 0.37 wt. % Mg and about 0.49 wt. % Mg;
- between about 0.08 wt. % Zn and about 0.10 wt. % Zn;
- about 0.02 wt. % Cr; and
- about 0.02 wt. % Ti.

* * * * *